(12) United States Patent
Inoue et al.

(10) Patent No.: US 7,606,469 B2
(45) Date of Patent: Oct. 20, 2009

(54) INFORMATION PROCESSING APPARATUS AND METHOD, AND PROGRAM

(75) Inventors: Masayuki Inoue, Tokyo (JP); Katsuro Matsuzaki, Kanagawa (JP); Kanako Nakamura, Tokyo (JP); Shinji Sakai, Tokyo (JP)

(73) Assignee: Sony Corporation, Tokyo (JP)

( * ) Notice: Subject to any disclaimer, the term of this patent is extended or adjusted under 35 U.S.C. 154(b) by 756 days.

(21) Appl. No.: 11/295,960

(22) Filed: Dec. 7, 2005

(65) Prior Publication Data

US 2006/0127036 A1    Jun. 15, 2006

(30) Foreign Application Priority Data

Dec. 9, 2004    (JP)    ............... 2004-356211

(51) Int. Cl.
H04N 7/64    (2006.01)
H04N 7/00    (2006.01)
(52) U.S. Cl. ........................................ 386/113; 386/46
(58) Field of Classification Search .................. 386/46, 386/117, 107, 124, 125, 45, 52, 105, 106, 386/96
See application file for complete search history.

(56) References Cited

U.S. PATENT DOCUMENTS

2002/0030797 A1*  3/2002  Enomoto .................... 355/18
2002/0037084 A1*  3/2002  Kakuhari et al. ............. 381/98

FOREIGN PATENT DOCUMENTS

| JP | 6 289863 | 10/1994 |
|----|----------|---------|
| JP | 2003 283994 | 10/2003 |
| JP | 2006 157197 | 6/2006 |

\* cited by examiner

*Primary Examiner*—Robert Chevalier
(74) *Attorney, Agent, or Firm*—Frommer Lawrence & Haug LLP; William S. Frommer

(57) ABSTRACT

An information processing apparatus and method is disclosed wherein slideshow images can be reproduced for an arbitrary period of time. A scaling coefficient calculation section divides a slideshow reproduction time period by a selected effect total time period to calculate the ratio between them as a scaling coefficient and supplies the calculated scaling coefficient to a correction section. The correction section corrects the reproduction time period of each effect of a deletion result supplied from a deletion candidate deletion section or each selected effect supplied from an effect selection section using the scaling coefficient supplied from the scaling coefficient calculation section so as to make the total reproduction time period of the selected effects coincide with a slideshow reproduction time period. The invention can be applied to a personal computer or the like which can handle still pictures.

10 Claims, 22 Drawing Sheets

PLAY LIST NAME

PHOTO ALBUM

USED TUNE

USED TEMPLATE

PREFERENTIAL IMAGE

TEMPLATE NAME

TYPE OF EFFECT

SAMPLING OUT METHOD

ATMOSPHERE

PPM
(Picture Per Minutes)

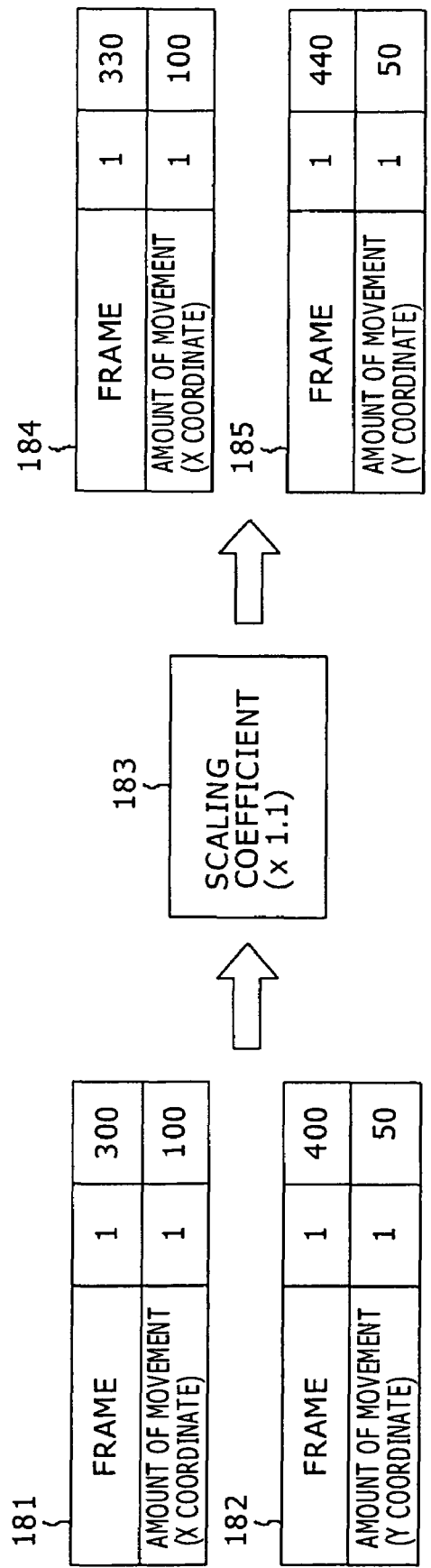

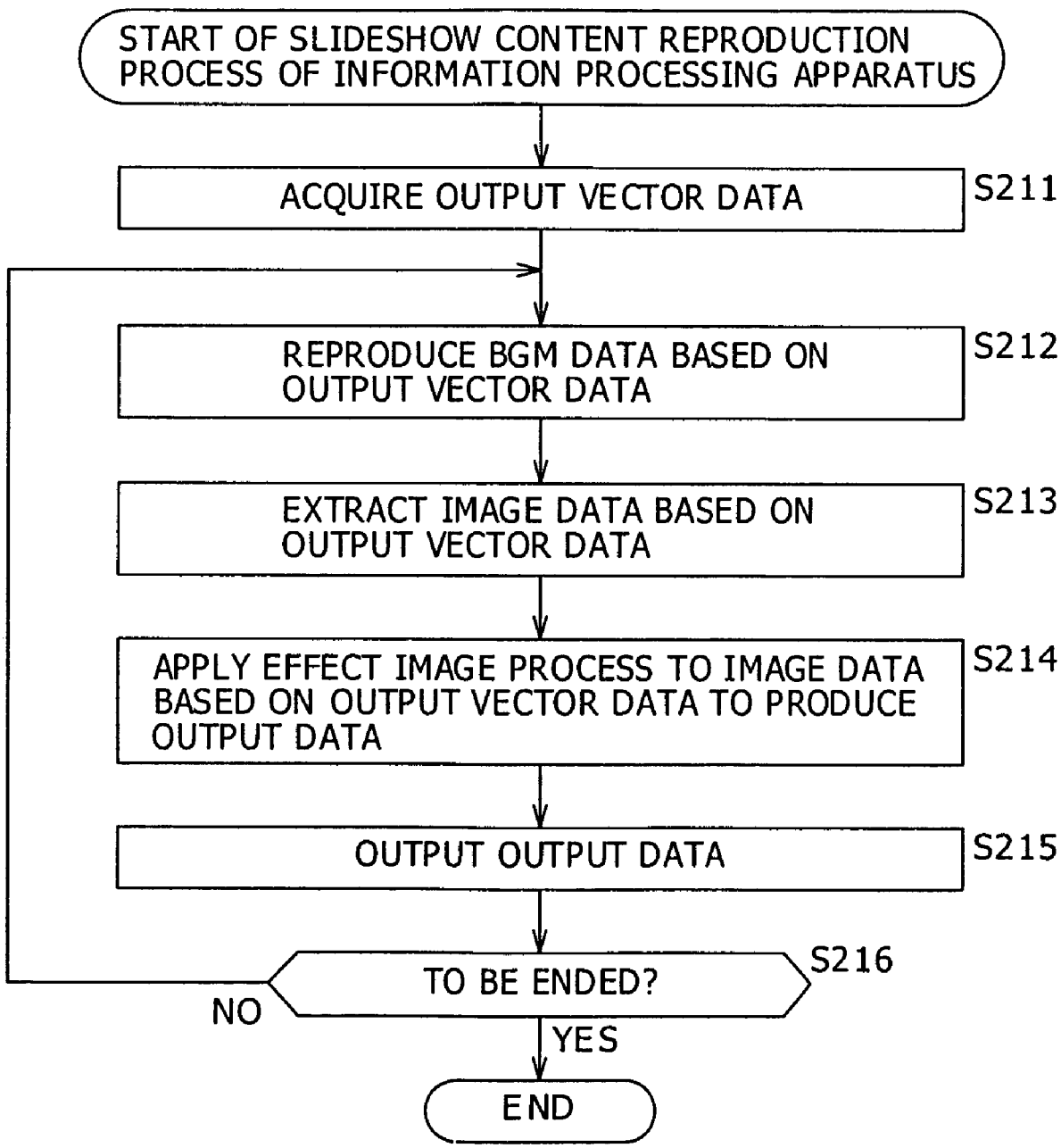

INFORMATION PROCESSING APPARATUS AND METHOD, AND PROGRAM

CROSS REFERENCES TO RELATED APPLICATIONS

The present invention contains subject matter related to Japanese Patent Application 2004-356211 filed with the Japanese Patent Office on Dec. 9, 2004, the entire contents of which being incorporated herein by reference.

BACKGROUND OF THE INVENTION

This invention relates to an information processing apparatus and method and a program, and more particularly to an information processing apparatus and method and a program wherein slideshow reproduction for an arbitrary period of time can be performed.

A slideshow function of automatically displaying still pictures in order after every predetermined interval of time such as one second is incorporated in various apparatus such as a personal computer which can handle still pictures picked up by a digital camera. In some of such apparatus, a tune to be used as BGM upon slideshow can be selected in accordance with a liking of its user.

Consequently, the user can enjoy still pictures, which are displayed automatically and successively, while enjoying a favorite tune without performing any operation for causing the still pictures to be displayed one by one.

Also an apparatus is available which has a slideshow function which does not display still pictures (picked up still pictures) fetched by the apparatus as they are but successively displays still pictures to which various effects are applied (refer to, for example, "DoCoMo mova P506iC Photococktail (trademark)", Internet <URL: http://panasonic.jp/mobile/p506ic/photo/index.html>: hereinafter referred to as Non-Patent Document 1).

In this instance, the user can select still pictures to be reproduced, a type of an effect and a tune of BGM to produce a content with BGM with which the still pictures to which the effect is applied can be displayed automatically and successively.

Further, a system for scheduling and processing image data and sound data has been proposed (for example, refer to JP-A-2001-507471, hereinafter referred to as Patent Document 1).

However, for example, in such an information processing apparatus wherein a slideshow application operates as disclosed in Non-Patent Document 1 and such a system as disclosed in Patent Document 1, in order to assure a high degree of operability to the user, a plurality of different effects are prepared in advance and an effect selected from among the effects is applied still pictures. Normally, each of the effects is a representation for displaying one or a plurality of still pictures for a period of time of several seconds. Accordingly, an image of the slideshow is formed from a set of such effects. This image is displayed in conformity with a designated tune.

However, in other words, the reproduction time period of each effect is determined in advance because it is information of "in what manner the still picture is to be represented when it is displayed." Accordingly, since also the reproduction time period of a slideshow image which is a combination of effects is determined by the combination, there is a subject to be solved in that reproduction of the image for an arbitrary period of time cannot be performed.

In particular, even if the reproduction time period of an image when an apparatus combines effects at a stage of production of a slideshow file is set so as to coincide with the reproduction time period of BGM, while the reproduction time period of BGM is determined arbitrarily for each tune, the degree of freedom of the reproduction time period of slideshow images which is a total reproduction time period of effects is so low that it is difficult to make the reproduction time period of slideshow images coincide with the reproduction time period of BGM.

If a difference appears between the reproduction time periods of images and BGM in this manner, then such a disadvantageous situation appears that BGM still continues to be outputted even after the display of images comes to an end or images continue to be displayed without sound after the BGM comes to an end. In this manner, there is the possibility that the degree of satisfaction of the user by the slideshow may be degraded.

SUMMARY OF THE INVENTION

It is a desire of the present invention to provide an information processing apparatus and method and a program wherein reproduction time periods of different effects can be scaled to perform reproduction of slideshow images for an arbitrary period of time.

In order to attain the desire described above, according to an embodiment of the present invention, there is provided an information processing apparatus for processing image data, including a coefficient calculation section for calculating a coefficient for use for correction of an image data reproduction time period which is a reproduction time period of an image data group formed from a plurality of image data, a correction section for correcting reproduction control information of the image data to vary the reproduction time period of the image data using the coefficient calculated by the coefficient calculation section, and a reproduction control section for reproducing the image data based on the reproduction control information corrected by the correction section.

According to another embodiment of the present invention, there is provided an information processing method for an information processing apparatus for processing image data, including the steps of: calculating a coefficient for use for correction of an image data reproduction time period which is a reproduction time period of an image data group formed from a plurality of image data; correcting reproduction control information of the image data to vary the reproduction time period of the image data using the coefficient calculated by the process at the coefficient calculation step; and reproducing the image data based on the reproduction control information corrected by the process at the correction step.

According to a further embodiment of the present invention, there is provided a program for causing a computer to perform processing of image data, the program including the steps of: calculating a coefficient for use for correction of an image data reproduction time period which is a reproduction time period of an image data group formed from a plurality of image data; correcting reproduction control information of the image data to vary the reproduction time period of the image data using the coefficient calculated by the process at the coefficient calculation step; and reproducing the image data based on the reproduction control information corrected by the process at the correction step.

In the information processing apparatus and method and the program, a coefficient for use for correction of an image data reproduction time period which is a reproduction time period of an image data group formed from a plurality of image data is calculated. Then, using the calculated coefficient, reproduction control information of the image data is corrected so as to vary the reproduction time period of the image data. Thereafter, the image data is reproduced based on the corrected reproduction control information.

With the information processing apparatus and method and the program, slideshow reproduction for an arbitrary period of time can be achieved.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a view showing an example of a play list;

FIG. 4 is a view showing an example of a template;

FIG. 11 is a view illustrating an example of correction of the reproduction time period of an effect;

FIG. 26 is a flow chart illustrating a slideshow content reproduction process of the information processing apparatus.

DETAILED DESCRIPTION OF THE PREFERRED EMBODIMENTS

Figure 1:
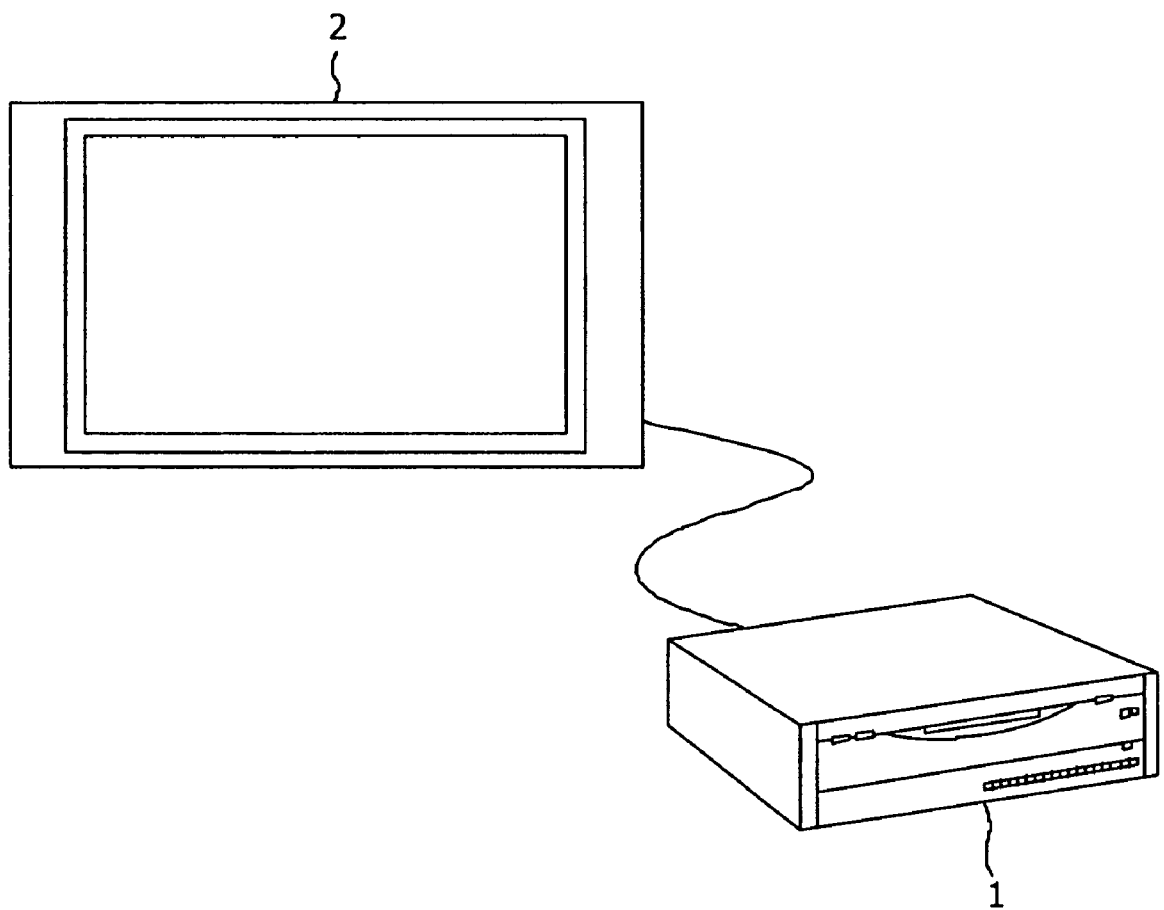
FIG. 1 is a schematic view showing an example of an appearance of an information processing apparatus to which the present invention is applied and a television receiver.

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Further, the following description does not signify that the prevent invention corresponding to particular elements described in the embodiment of the present invention is all described in the claims. In other words, the following description does not deny the presence of an invention which corresponds to a particular element described in the description of the embodiment of the present invention but is not recited in the claims, that is, the description does not deny the presence of an invention which may be filed for patent in a divisional patent application or may be additionally included into the present patent application as a result of later amendment to the claims.

According to an embodiment of the present invention, an information processing apparatus (for example, an information processing apparatus 1 of FIG. 1) for processing image data is provided. The information processing apparatus includes a coefficient calculation section (for example, a scaling coefficient calculation section 167 of FIG. 8) for calculating a coefficient for use for correction of an image data reproduction time period which is a reproduction time period of an image data group formed from a plurality of image data, a correction section (for example, a correction section 168 of FIG. 8) for correcting reproduction control information of the image data to vary the reproduction time period of the image data using the coefficient calculated by the coefficient calculation section, and a reproduction control section (for example, an effect image processing section 146 of FIG. 7) for reproducing the image data based on the reproduction control information corrected by the correction section.

The information processing apparatus may be configured such that the reproduction control information is vector data, and the correction section refers to a table (for example, Table 181 or 182 of FIG. 11) of frames included in the reproduction control information and a parameter to correct information of the frames using the coefficient.

The information processing apparatus may be configured such that the reproduction control information includes a set of pieces of effect control information of vector data (for example, effects A to C of FIGS. 10A to 10D) which is control information for an effect process for the image data of the image data group to be reproduced, and the correction section corrects the reproduction control information so as to change the reproduction time period of the image data for each of the pieces of the effect control information.

The coefficient calculation section may multiply the image data reproduction time period to calculate the coefficient with which the image data reproduction time period coincides with a sound data reproduction time period (for example, a slideshow reproduction time period of FIGS. 10A to 10D) which is a reproduction time period of sound data to be reproduced together with the image data group.

Figure 8:
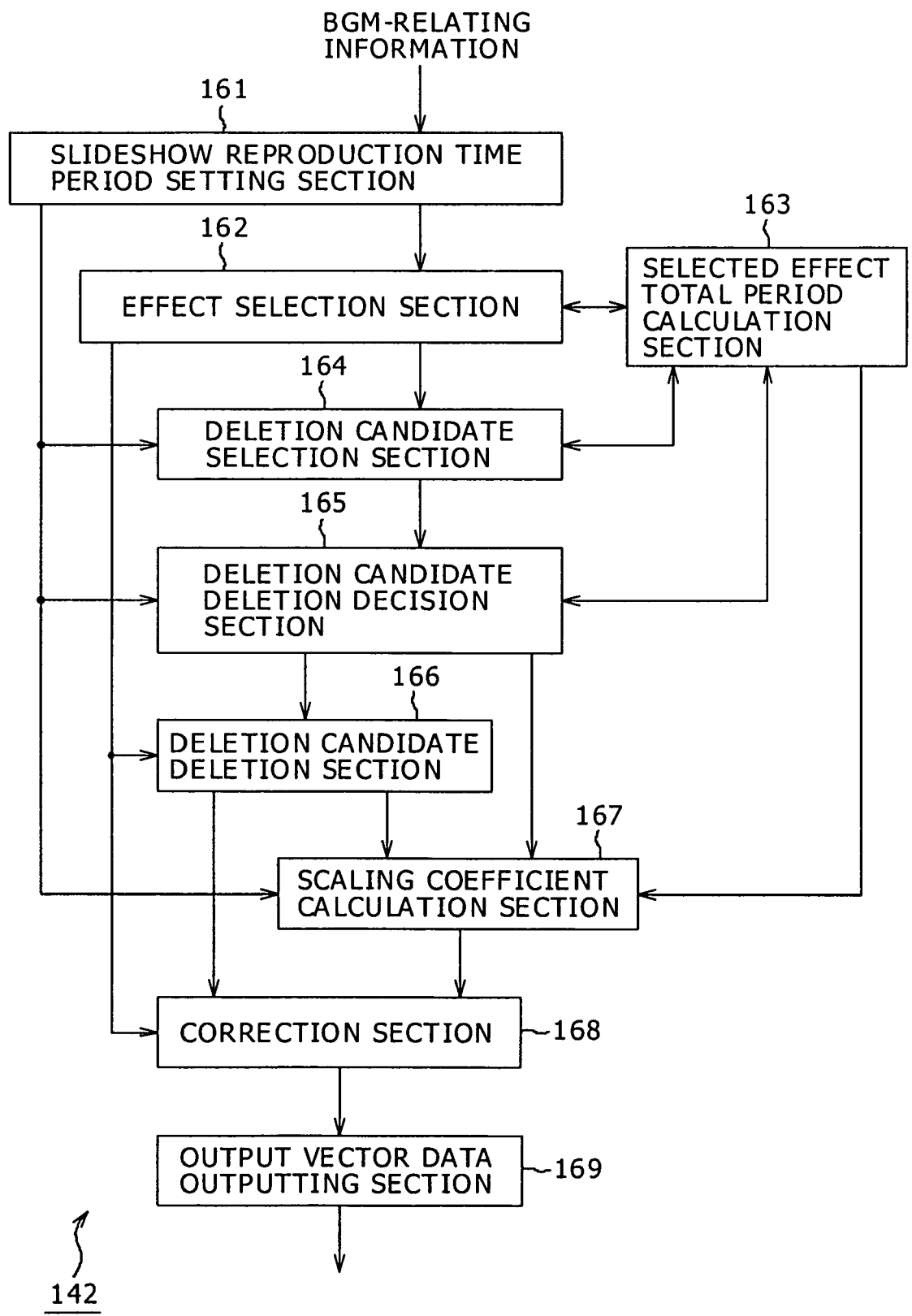
FIG. 8 is a block diagram showing an example of a configuration of an output vector production section of FIG. 7.

The information processing apparatus may further include an effect selection section (for example, an effect selection section 162 of FIG. 8) for selecting a plurality of pieces of effect control information prepared in advance one by one, and a total production time period calculation section (for example, a selected effect total time period calculation section 163 of FIG. 8) for totaling the reproduction time periods of the image data of those pieces of the effect control information which are selected by the effect selection section to calculate a total reproduction time period, the effect selection section repeating the selection of the effect control information until the effect selection section ends the selection when the total reproduction time period calculated by the total reproduction time period calculation section exceeds the reproduction time period of the sound data.

The information processing apparatus may further include an effect control information deletion section (for example, a deletion candidate deletion section 166 of FIG. 8) for deleting one of the pieces of the effect control information from the set of effect control information when the effect selection section ends the selection of the effect control information and including the set of effect control information after the deletion into the reproduction control information.

The information processing apparatus may further include an effect control information selection section (for example, a deletion candidate selection section 164 of FIG. 8) for deleting one of the pieces of the effect control information from the set of effect control information when the effect selection section ends the selection of the effect control information to select those pieces of the effect control information with which the total reproduction time period is most approximate to the reproduction time period of the sound data, the effect control information deletion section deleting the piece of the effect control information selected by the effect control information selection section.

The information processing apparatus may further include a decision section (for example, a deletion candidate deletion decision section 165 of FIG. 8) for deciding whether or not the total reproduction time period where the piece of the effect control information selected by the effect control information selection section is deleted is more proximate to the reproduction time period of the sound data than the total reproduction time period where the piece of the effect control information selected by the effect control information selection is not deleted, the effect control information deletion section deleting the piece of the effect control information selected by the effect control information selection section when it is decided by the decision section that the total reproduction time period where the piece of the effect control information selected by the effect control information selection section is deleted is more proximate to the reproduction time period of the sound data than the total reproduction time period where the piece of the effect control information selected by the effect control information selection is not deleted.

According to another embodiment of the present invention, an information processing method for an information processing apparatus (for example, an information processing apparatus 1 of FIG. 1) for processing image data is provided. The information processing method includes the steps of: calculating a coefficient for use for correction of an image data reproduction time period which is a reproduction time period of an image data group formed from a plurality of image data (for example, a step S9 of FIG. 9); correcting reproduction control information of the image data to vary the reproduction time period of the image data using the coefficient calculated by the process at the coefficient calculation step (for example, a step S10 of FIG. 9); and reproducing the image data based on the reproduction control information corrected by the process at the correction step (for example, a step S155 of FIG. 23).

According to a further embodiment of the present invention, there is provided a program which includes steps similar to those of the information processing method described above.

In the following, an embodiment of the present invention is described with reference to the drawings.

FIG. 1 shows an example of an appearance of an information processing apparatus 1 to which the present invention is applied and a television receiver 2 (referred to the the TV2 hereinafter) connected to the information processing apparatus 1 through a cable.

The information processing apparatus 1 has a function for fetching still pictures picked up by a digital camera or the like into a built-in HDD (Hard Disk Drive) through a memory card, a USB (Universal Serial Bus) cable or the like and displaying the still pictures on the TV2. The information processing apparatus 1 performs slideshow for automatically and successively displaying (without depending upon any operation of the user) still pictures to which various effects are applied while a tune selected by the user is being played as BGM.

Figure 2A:
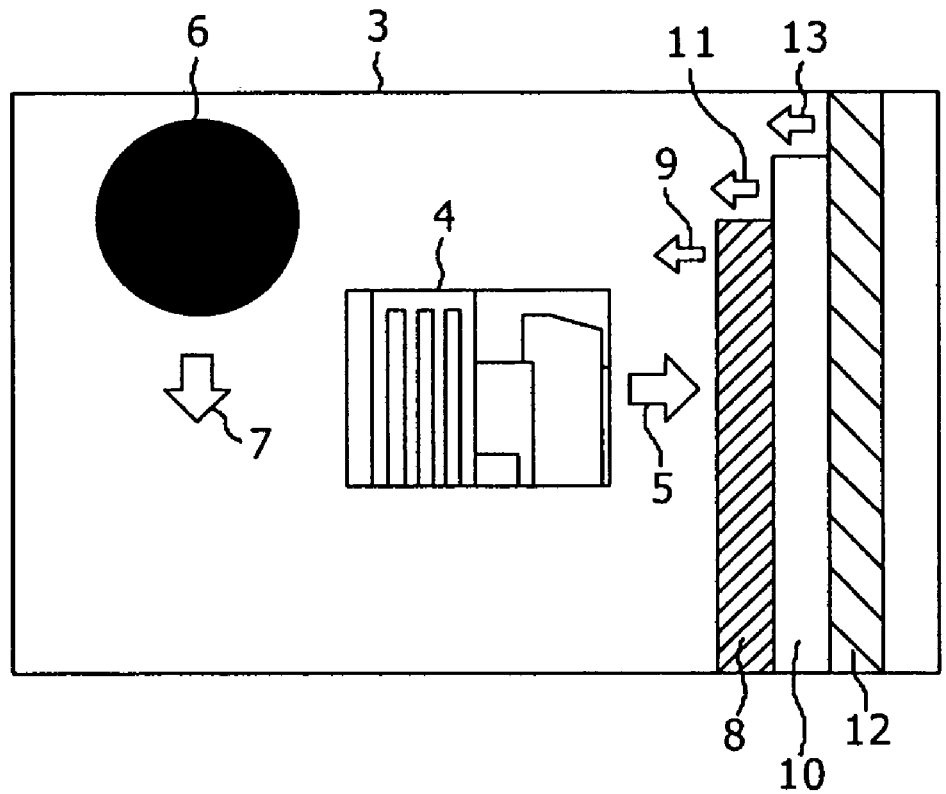
FIGS. 2A and 2B are views illustrating an example of an effect.
Figure 2B:
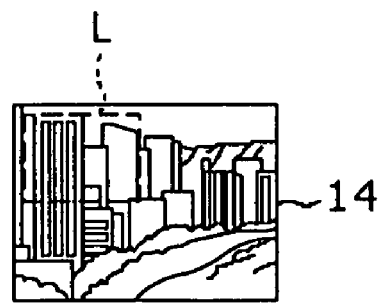

FIGS. 2A and 2B are views showing an example of an effect to be applied to a still picture. As seen in FIG. 2A, a frame image 3 after the effect is applied to the still picture is formed from a still picture 4 and other effect images.

In FIG. 2A, the still picture 4 is provided by the user such as a photograph image picked up by a digital camera. As shown in FIG. 2A, the image size of the still picture 4 is smaller than that of the frame image 3. Further, by successively displaying a plurality of frame images 3 as moving pictures, the still picture 4 apparently moves in a widthwise direction from the left to the right as indicated by an arrow mark 5 in the frame image 3.

Further, in the frame image 3, together with the still picture 4, a circular object 6 and rectangular objects 8, 10 and 12 are displayed as effects. By successively displaying a plurality of frame images 3 as moving pictures, the circular object 6 apparently moves in a vertical direction from an upper portion to a lower portion as indicated by an arrow mark 7 in the frame image 3. The rectangular objects 8, 10 and 12 are positioned adjacent each other, and apparently move, by successively displaying the plural frame images 3 as moving pictures, in a widthwise direction from the right to the left as indicated by arrow marks 9, 11 and 13, respectively, in the frame image 3.

Such a representation for one or several still pictures 4 as described above is hereinafter referred to as effect. Normally, an effect is a representation for displaying a set of still pictures for a period of time of several seconds. For example, the display size, shape and movement of the still picture 4 and the size, shape, movement and color of an object to be displayed together with the still picture 4 are different among different effects. Normally, a slideshow is a content for approximately several minutes formed from a plurality of effects.

However, the total time period of basic reproduction time periods of the effects does not necessarily coincide with the reproduction time period of the BGM. Therefore, in such an instance, the information processing apparatus 1 performs scaling of the reproduction time periods of the effects to make the total time period of reproduction time periods of the effects coincide with the reproduction time period of the BGM thereby to make the reproduction time periods of images and sound coincide with each other. Details of the process in this instance are hereinafter described.

In this manner, by displaying a group of still pictures while they are represented as a slideshow, the information processing apparatus 1 can enhance the amusement property of the group of still pictures and the degree of satisfaction of the user who enjoys the slideshow.

It is to be noted that the still picture 4 shown in FIG. 2A may be a provided photographed image itself which is not processed or a reduced image of the photographed image or else such a partial image L of the photographed image 14 as shown in FIG. 2B.

In this manner, a content (hereinafter referred to suitably as slideshow content) which implements a slideshow with BGM for automatically and successively displaying still pictures to which various effects are applied while a selected tune is played as BGM is produced by the user performing various selections in accordance with a wizard displayed on the TV 2.

For example, the user can produce a slideshow content (actually a "play list" as hereinafter described) principally by two operations including an operation for selecting a photo album (a folder in which a still picture file is stored) in which still pictures to be reproduced by slideshow are stored and another operation for selecting a tune to be played as BGM.

In particular, in the information processing apparatus 1, for example, a predetermined number of tunes which can be utilized as BGM are stored in the built-in HDD, and effects for representing atmospheres matching with those of the tunes are coordinated with the tunes. The substance of each effect is set so as to match with the atmosphere of the tune depending upon, for example, the tempo, the genre or the like of the tune.

Accordingly, when a slideshow content is produced, only if the user selects a favorite tune to be played as BGM, then also an effect matching with an atmosphere of the selected tune can be selected.

Further, only if the user selects a photo album, then all of still pictures stored in the photo album can be selected as still pictures of a reproduction object without selecting the still pictures to be reproduced one by one.

For example, where the reproduction time required when all of the still pictures stored in the photo album selected by the user are reproduced is different from that required to reproduce the tunes of BGM one time, the information processing apparatus 1 automatically performs an adjustment process and so forth for adjusting the number of still pictures to be used as a reproduction object such as sampling out, repetitive displaying or the like of the still pictures stored in the photo album so that the reproduction time of the still pictures and the reproduction time of the tunes are substantially equal to each other.

Further, the information processing apparatus 1 performs scaling of the reproduction time period of a selected effect in order to make the reproduction time periods of an image and sound coincide with each other as described hereinabove.

Consequently, only it is necessary for the user to merely select a photo album in which still pictures to be reproduced are stored without being conscious of the number of still pictures stored in one photo album, the reproduction time of a tune of BGM and so forth.

In response to such selection of the user as described above (selection of a photo album and a tune of BGM), the information processing apparatus 1 produces such a play list 15 as shown in FIG. 3.

When the user selects a certain play list 15, a photo album and a tune of BGM which are objects of the play list 15 are read out, and still pictures stored in the photo album are reproduced in accordance with a reproduction procedure defined by the play list 15. At this time, also the read out tune is reproduced as BGM. In this manner, the play list 15 is information which defines a reproduction procedure of still pictures for producing a slideshow content.

Here, the substance of description of the play list 15 is described.

Referring to FIG. 3, for example, "play list name", "photo album", "used tune", "used template" and "preferential image" are described in the play list 15.

The "play list name" is a title of the play list 15 and is set by the user as occasion demands.

The "photo album" is information which designates a photo album into which still pictures of an object of reproduction are to be stored. When a play list 15 is selected by the user, a photo album designated by the "photo album" of the selected play list 15 is read out from the HDD, and the still pictures stored in the photo album are reproduced (displayed).

The "used tune" is information which designates a tune of BGM. When a play list 15 is selected by the user, a tune designated by the "used tune" of the selected play list is read out from the HDD and reproduced as BGM.

The "used template" is coordinated with a tune designated by the "used tune" and is information which designates a template in which the substance of an effect and so forth are described (for example, "template name" of FIG. 4). When a play list 15 is selected by the user, a template designated by the "used template" of the selected play list 15 is read out from the HDD, and an effect of the substance described in the template is applied to the still pictures of a reproduction object. The template is hereinafter described with reference to FIG. 4.

The "preferential image" is information which designates a still picture to be displayed preferentially from among still pictures stored in a photo album designated by the "photo album". Where a great number of still pictures are stored in a photo album, some of them are occasionally sampled out in accordance with the reproduction time of the tune of BGM as described hereinabove. However, a still picture designated by the "preferential image" is not made an object of the sampling out but is selected as a still picture of an object of reproduction preferentially to the other still pictures. The designation of the "preferential picture" may be performed automatically by the information processing apparatus 1 or may be designated by the user itself.

FIG. 4 shows an example of description of a template.

Referring to FIG. 4, for example, "template name", "type of effect", "sampling out method, "atmosphere" and "PPM (Picture Per Minutes)" are described in the template 16.

The "template name" is the title of the template 16.

The "type of effect" is information which designates candidates for a type (substance) of an effect to be applied to still pictures of an object of reproduction. A plurality of sub effects are prepared in advance which represent, for example, which part of one still picture should be displayed, which part of the entire screen should be displayed, what size should be used for the display, and in what direction a movement should be performed, and the substance of one effect is determined by a combination of sub effects in accordance with the tempo and so forth of a tune with which the template 16 is coordinated. The combination of sub effects or the like is designated by the "type of effect" of the template 16. In other words, the "type of effect" is a list of candidates for the effect to be utilized when slideshow is performed in accordance with the template 16, and usually, a plurality of candidates are listed up. Then, an arbitrary one of the effects included in the list is utilized for the slideshow.

The "sampling out method" is information which designates a method to be used to sample out still pictures stored in a photo album. The "sampling out method" is actually used to adjust the reproduction time of the still pictures and the reproduction time of a tune of BGM so as to be substantially equal to each other. It is to be noted that the information processing apparatus 1 may be configured otherwise such that the user can set on/off of the sampling out of still pictures. When the sampling out of still pictures is off (when sampling out is not performed), all of the still pictures stored in a photo album designated by the "photo album" of the play list 15 are determined as still pictures of an object of reproduction.

The "atmosphere" is information representative of an atmosphere represented where still pictures are reproduced in accordance with the template 16.

The "PPM" is information which designates the number of still pictures to be reproduced (displayed) for one minute. The information processing apparatus 1 reproduces each of still pictures of an object of reproduction for a period of time designated by the "PPM".

Figure 5:
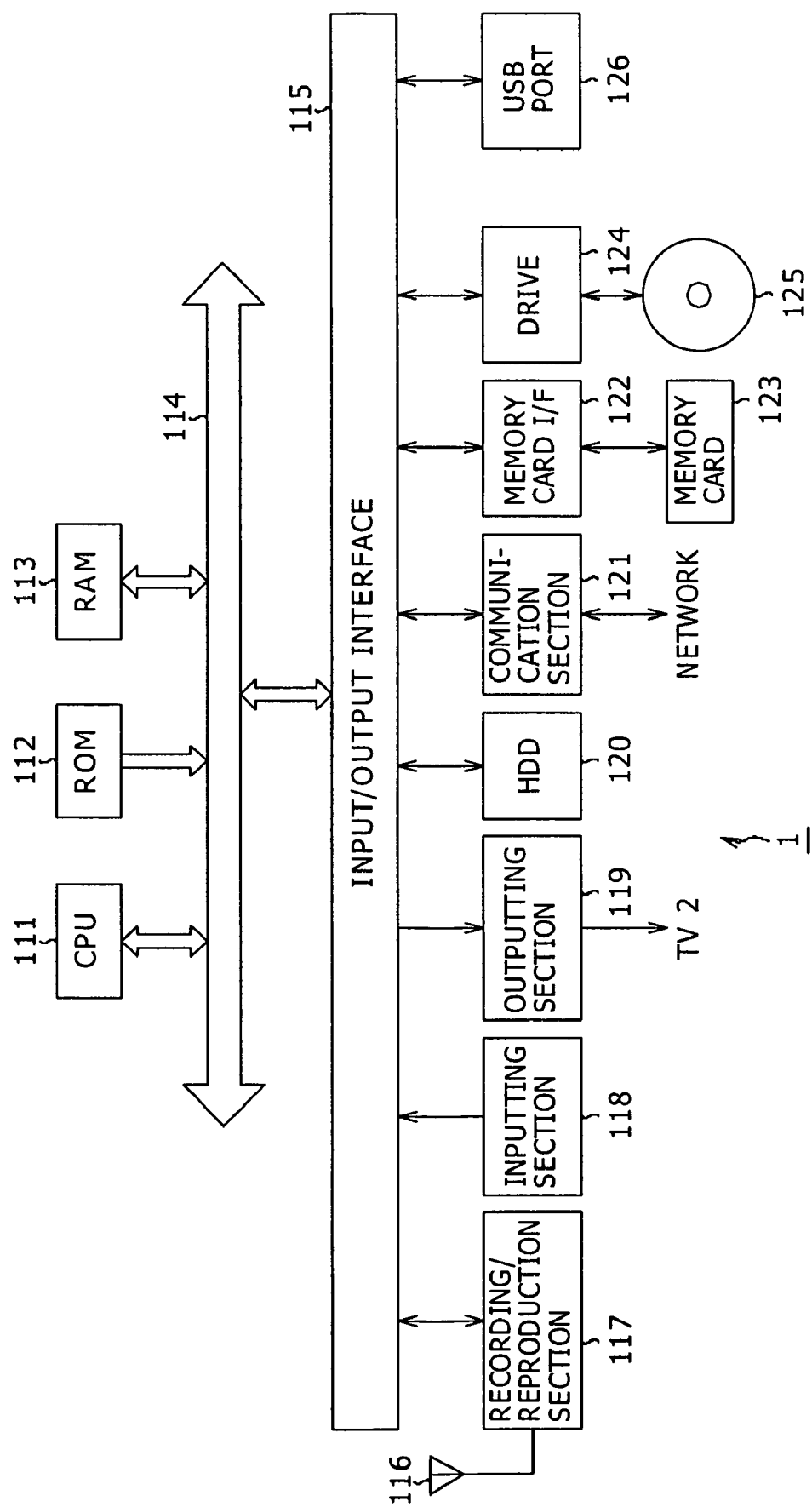
FIG. 5 is a block diagram showing an example of a configuration of the information processing apparatus.

FIG. 5 shows an example of a configuration of the information processing apparatus 1 of FIG. 1.

Referring to FIG. 5, a CPU (Central Processing Unit) 111 executes various processes in accordance with a program stored in a ROM (Read Only Memory) 112 or a program loaded from a HDD (Hard Disk Drive) 120 into a RAM (Random Access Memory) 113. Also data necessary for the CPU 111 to execute the processes are suitably stored into the RAM 113.

The CPU 111, ROM 112 and RAM 113 are connected to one another by a bus 114. Also an input/output interface 115 is connected to the bus 114.

A recording/reproduction section 117, an inputting section 118, an outputting section 119, a HDD 120, a communication section 121, a memory card I/F (InterFace) 122, a drive 124 and a USB port 126 are connected to an input/output interface 115.

The recording/reproduction section 117 compresses television program data acquired from a signal supplied thereto from an antenna 116 in accordance with, for example, the MPEG (Moving Picture Experts Group) 2 method and supplies the data (video content) obtained by the compression to the HDD 120 through the input/output interface 115 so as to be stored into the HDD 120. Further, the recording/reproduction section 117 decompresses a video content stored in the HDD 120 and outputs resulting image data of a television program from the outputting section 119 to the TV2. In short, the information processing apparatus 1 has a function of recording and reproducing a television program.

The inputting section 118 is formed from, for example, a reception element of infrared rays. The inputting section 118 receives a signal from a remote controller not shown and outputs information representative of the substance of an operation of a user to the CPU 111.

The outputting section 119 converts image data supplied thereto through the input/output interface 115 into an analog signal and outputs a resulting image signal to the TV2 through a cable. To the outputting section 119, for example, image data obtained by reproduction of a still picture in accordance with a play list, image data of a video content reproduced by the recording/reproduction section 117 or like data are supplied. Further, the outputting section 119 converts tune data supplied thereto through the input/output interface 115 into an analog signal and outputs the resulting signal to the TV2.

The HDD 120 stores a video content obtained by the recording/reproduction section 117, a still picture fetched from a memory card 123 through the memory card I/F 122, a still picture fetched from a digital camera through the USB port 126 and a USB cable and tune data (audio content) fetched from an optical disk 125 by the drive 124 and compressed in accordance with the MP3 (MPEG Audio Layer-3) method or the like.

The HDD 120 further stores play lists produced through selection by the user, data of tunes of BGM, templates coordinated with the tunes of BGM, slideshow contents and so forth.

The communication section 121 performs a communication process through a network.

The memory card I/F 122 reads out data stored in the memory card 123 loaded in a memory card slot formed in a housing of the information processing apparatus 1 and stores the read out data into the HDD 120 or the like. For example, data of a still picture are fetched into the information processing apparatus 1 through the memory card 123.

The drive 124 drives the optical disk 125 loaded therein to perform reading out of data stored on the optical disk 125 and writing of data on the optical disk 125. The optical disk 125 is a CD (Compact Disk), a DVD (Digital Versatile Disk) or the like, and data of a still picture, an audio content, a video content or the like are fetched into the information processing apparatus 1 from the optical disk 125. Further, the drive 124 suitably writes a produced slideshow content on the optical disk 125.

It is to be noted that the information processing apparatus 1 has a function also as a game machine. Also an image of a game (program) read out from the optical disk 125 by the drive 124 is supplied to the outputting section 119 through the input/output interface 115 and outputted to the TV2.

The USB port 126 performs communication with an external apparatus such as a digital camera through the USB cable to store a fetched still picture (image data) into the HDD 120.

Figure 6:
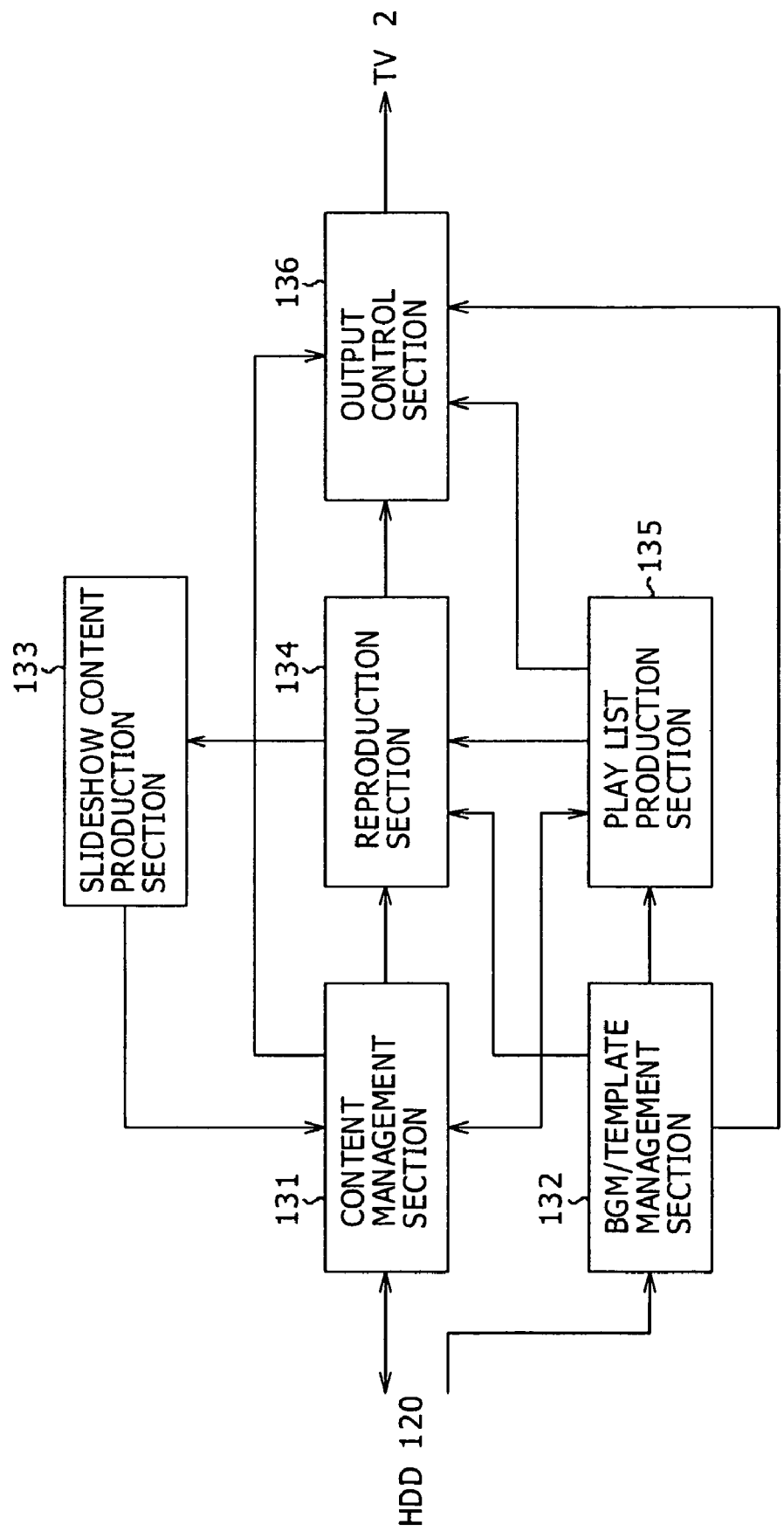
FIG. 6 is a block diagram showing an example of a functional configuration of the information processing apparatus.

FIG. 6 shows a functional configuration of the information processing apparatus 1. At least some of the various functional sections shown in FIG. 6 are implemented by a predetermined program executed by the CPU 111 of FIG. 5.

The information processing apparatus 1 includes a content management section 131, a BGM/template management section 132, a slideshow content production section 133, a reproduction section 134, a play list production section 135 and a output control section 136.

The content management section 131 manages various contents such as still pictures, video contents, audio contents and play lists stored in the HDD 120. Information of the contents managed by the content management section 131 is outputted to the output control section 136 and used for display of a menu screen hereinafter described.

The content management section 131 supplies, upon production of a play list, information of the title of a photo album selected by the user to the play list production section 135. Upon reproduction of a play list, the content management section 131 reads out a photo album which is a reproduction object of the play list (photo album designated by the "photo album" of the play list) from the HDD 120 and outputs the photo album to the reproduction section 134. Further, the content management section 131 stores a slideshow content produced by the slideshow content production section 133 and supplied thereto into the HDD 120.

The BGM/template management section 132 manages the tunes of BGM and the templates in a coordinated relationship with each other and stores them into the HDD 120. Upon production of a play list, the BGM/template management section 132 outputs information of the tunes of BGM managed thereby to the output control section 136 and outputs the information of a tune of BGM selected by the user and a template coordinated with the tune to the play list production section 135. On the other hand, upon reproduction of a play list, the BGM/template management section 132 outputs a template designated by the "used template" of the play list and a tune of BGM designated by the "used tune" to the reproduction section 134.

The slideshow content production section 133 acquires output vector data equivalent to a reproduction result of the reproduction section 134 (an array of a plurality of still pictures reproduced successively in accordance with a play list) from the reproduction section 134 and adds information necessary for a title and so forth to the output vector data to produce a slideshow content completed as a content. The slideshow content produced by the slideshow content production section 133 is outputted to the content management section 131 and stored into the HDD 120.

When an instruction to reproduce a play list is issued, the reproduction section 134 acquires the play list which is an object of the reproduction instruction issued, a photo album of the play list designated by the "photo album" and a tune of BGM designated by the "used tune" to perform reproduction of the play list. Further, the reproduction section 134 supplies output vector data equivalent to output data in accordance with a request from the slideshow content production section 133 to the slideshow content production section 133. A detailed configuration of the reproduction section 134 is described below with reference to FIG. 7.

The play list production section 135 produces such a play list as shown in FIG. 3 which describes information of a photo album selected by the user, information of a tune of BGM selected by the user, information of a template coordinated with the tune and so forth and outputs the produced play list to the content management section 131 or the reproduction section 134. Information of the photo album selected by the user during production of a play list is received from the content management section 131, and the information of the tune of BGM and the information of the template coordinated with the tune are received from the BGM/template management section 132.

The output control section 136 produces a screen (wizard screen) for guiding a production procedure of a play list to the user or a menu screen to be used as a start screen for operations to be executed using the information processing apparatus 1 based on information supplied thereto from the content management section 131, BGM/template management section 132 and reproduction section 134 and controls the TV2 to display the wizard screen or the menu screen.

Figure 7:
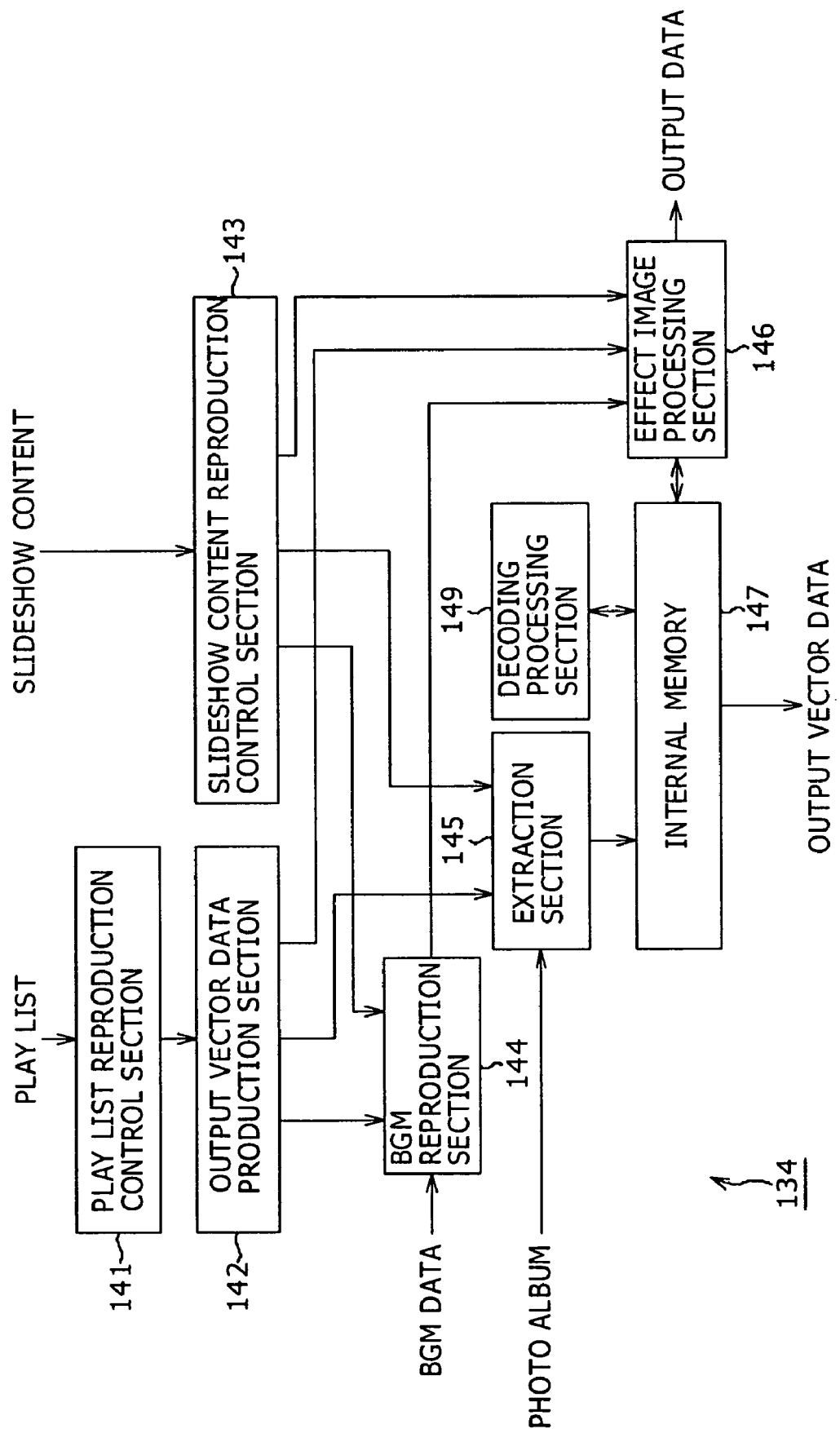
FIG. 7 is a block diagram showing an example of a configuration of a reproduction section shown in FIG. 6.

FIG. 7 shows an example of a detailed configuration of the reproduction section 134.

Referring to FIG. 7, the reproduction section 134 includes a play list reproduction control section 141, an output vector data production section 142, a slideshow content reproduction control section 143, a BGM reproduction section 144, an extraction section 145, an effect image processing section 146, an internal memory 147, a buffer management section 148 and a decoding processing section 149.

When a play list whose reproduction instruction is issued by the user is received from the content management section 131, the play list reproduction control section 141 analyzes the play list and supplies information necessary for production of output vector data to the output vector data production section 142.

The output vector data production section 142 produces output vector data, which are data of the vector format of a slideshow file to be outputted, based on the information supplied thereto from the play list reproduction control section 141 (information of the play list, a template and so forth). The information of an effect or the like is formed as information of the vector format wherein it is represented as a set of parameters of equations of coordinates of points or lines or planes which interconnect the points, plotting information such as painting up, a special effect or the like. In particular, the output vector data production section 142 selects, from within information designated by the play list, BGM, a still picture, an effect and so forth to be adopted for a slideshow file and produces data (output vector data) of the vector format equivalent to the slideshow file to be outputted using the selected information. It is to be noted that the play list does not particularly designate still pictures to be displayed, an order in which the still pictures are to be displayed, or an effect to be applied to the still pictures. The output vector data production section 142 determines a particular substance of the slideshow file by producing such output vector data as described above. The output vector data production section 142 supplies the produced output vector data to the BGM reproduction section 144, extraction section 145, and effect image processing section 146.

It is to be noted that the output vector data production section 142 performs a scaling process of adjusting the reproduction time periods in the output vector data produced in this manner so that the reproduction time period of an image and the reproduction time period of BGM may coincide with each other.

The output vector data production section 142 supplies the produced output vector data to the BGM reproduction section 144, extraction section 145 and effect image processing section 146.

When the slideshow content designated by the user, that is, output vector data, are received from the content management section 131, the slideshow content reproduction control section 143 supplies the slideshow content (output vector data) to the BGM reproduction section 144, extraction section 145 and effect image processing section 146 to control reproduction of the slideshow content. The slideshow content is a content completed as a slideshow file and is formed from data of the vector format. In other words, the slideshow content is the output vector data described above stored as a content.

The BGM reproduction section 144 acquires a tune of BGM from the BGM/template management section 132 based on the output vector data supplied thereto from the output vector data production section 142 or the slideshow content reproduction control section 143, reproduces the acquired tune data and supplies the reproduced tune data to the effect image processing section 146.

The extraction section 145 performs sampling out or the like of still pictures stored in a photo album supplied thereto from the content management section 131 in accordance with the output vector data supplied thereto from the output vector data production section 142 or the slideshow content reproduction control section 143 to extract still pictures of an object of reproduction. By the sampling out process, the reproduction time of still pictures is adjusted so as to be substantially equal to the reproduction time of the BGM. Each still picture extracted by the extraction section 145 is supplied as a still picture of an object of reproduction to the effect image processing section 146.

It is to be noted that, if the sampling out process is set inoperative, then the extraction section 145 does not perform the sampling out process of still pictures but supplies all still pictures stored in the photo album and supplied thereto from the content management section 131 as still pictures of an object of reproduction to the internal memory 147 so as to be stored into the internal memory 147.

The effect image processing section 146 acquires still pictures (still pictures of image data decoded as hereinafter described) supplied thereto from the output vector data production section 142 or the slideshow content reproduction control section 143, applies an effect to the still pictures, produces output data from the data of the still pictures (frame image data of the raster format), to which the effect is applied, in a synchronized relationship or the like with BGM data supplied thereto from the BGM reproduction section 144, and supplies the output data to the output control section 136. Further, the effect image processing section 146 supplies the used output vector data at a predetermined timing to the internal memory 147 so as to be stored into the internal memory 147.

The internal memory 147 is a memory area assured in the RAM 113 by a process executed by the CPU 111 of FIG. 5 and is utilized as a buffer memory for temporarily retaining still pictures (image data) of an object of reproduction, as a memory for temporarily storing the output vector data, and so forth. The output vector data are outputted to the slideshow content production section 133 as occasion demands. A particular configuration of the internal memory 147 is hereinafter described with reference to FIG. 8.

The decoding processing section 149 acquires image data retained in the buffer of the internal memory 147 (encoded image data supplied from the extraction section 145 and stored in the internal memory 147) and performs a decoding process for the acquired image data in accordance with a method corresponding to the encoding method. After the decoding process is completed, the decoding processing section 149 stores the decoded image data into the buffer of the internal memory 147 again.

Reproduction of a play list by the reproduction section 134 which has such a configuration as described above is performed also when an instruction to perform preview reproduction of the play list being produced is issued by the user. When an instruction to perform preview reproduction of the play list is issued, the play list being produced is supplied from the play list production section 135 to the reproduction section 134, and reproduction of the play list is performed by the components shown in FIG. 7.

FIG. 8 shows an example of a detailed configuration of the output vector data production section 142 of FIG. 7.

Referring to FIG. 8, the output vector data production section 142 includes a slideshow reproduction time period setting section 161, an effect selection section 162, a selected effect total time period calculation section 163, a deletion candidate selection section 164, a deletion candidate deletion decision section 165, a deletion candidate deletion section 166, a scaling coefficient calculation section 167, a correction section 168 and an output vector data outputting section 169.

The slideshow reproduction time period setting section 161 sets a slideshow reproduction time period based on information (BGM-relating information) relating to BGM designated by a play list supplied thereto from the play list reproduction control section 141. In particular, the slideshow reproduction time period setting section 161 sets the reproduction time period of selected BGM as a reproduction time period of the slideshow. The slideshow reproduction time period setting section 161 supplies information of the set slideshow reproduction time period to the effect selection section 162, deletion candidate selection section 164, deletion candidate deletion decision section 165 and scaling coefficient calculation section 167.

The effect selection section 162 selects candidates of effects designated by a template corresponding to the play list one by one so that the reproduction time period of the slideshow supplied from the slideshow reproduction time period setting section 161 may be obtained to construct a slideshow file. At this time, the effect selection section 162 supplies information of the selected effect to the selected effect total time period calculation section 163 so as to calculate the total reproduction time period of selected effects (selected effect total time period).

If the selected effect total time period exceeds the reproduction time period of the slideshow, then the effect selection section 162 ends the selection of an effect and supplies the selected effects (vector data) to the deletion candidate selection section 164. Further, the effect selection section 162 supplies the selected effects (vector data) also to the deletion candidate deletion section 166 and the correction section 168 as occasion demands.

The selected effect total time period calculation section 163 totals the reproduction time periods of the effects supplied thereto from the selected effect section 162 to calculate a selected effect total time period and supplies information of the selected effect total time period to the effect selection section 162. Further, the selected effect total time period calculation section 163 calculates the selected effect total time period where a designated effect is deleted from the selected effects in accordance with a request from the deletion candidate selection section 164 and supplies the calculated selected effect total time period to the deletion candidate selection section 164. Furthermore, the selected effect total time period calculation section 163 calculates selected effect total time periods for a case wherein the candidate of deletion is deleted from the selected effects and another case wherein the candidate of deletion is not deleted from the selected effects in accordance with a request from the deletion candidate deletion decision section 165 and supplies the calculated selected effect total time periods to the deletion candidate deletion decision section 165. Further, the selected effect total time period calculation section 163 supplies the selected effect total time period of finally determined selected effects in accordance with a request from the scaling coefficient calculation section 167.

The deletion candidate selection section 164 acquires information of the slideshow reproduction time period from the slideshow reproduction time period setting section 161 when it receives the selected effects from the effect selection section 162. Then, the deletion candidate selection section 164 causes the selected effect total time period calculation section 163 to calculate the selected effect total time period in a case wherein each effect is deleted from the selected effects. After the deletion candidate selection section 164 acquires such information as mentioned above, it selects the selected effect total time period which is most proximate to the slideshow reproduction time period, selects the effect deleted then as a candidate of deletion and supplies information of the candidate of deletion to the deletion candidate deletion decision section 165.

After the deletion candidate deletion decision section 165 acquires the information of the candidate of deletion from the deletion candidate selection section 164, it acquires information of the slideshow reproduction time period from the slideshow reproduction time period setting section 161. The deletion candidate deletion decision section 165 further acquires, from the selected effect total time period calculation section 163, information of the selected effect total time period corresponding to the selected effects selected by the effect selection section 162 and information of the selected effect total time period in a case wherein the candidate of deletion supplied from the deletion candidate selection section 164 is deleted from the selected effects. The deletion candidate deletion decision section 165 decides which one of the selected effect total time period in the case before the candidate of deletion is deleted from the selected effects and the selected effect total time period in the case after the candidate of deletion is deleted from the selected effects is more proximate to the slideshow reproduction time period and then decides, based on a result of the decision, whether or not the candidate of deletion should be deleted. In particular, if the selected effect total time period becomes more proximate to the slideshow reproduction time period when the candidate of deletion is deleted from the selected effects, then the deletion candidate deletion decision section 165 decides that the candidate of deletion should be deleted from the selected effects and supplies the result of the decision to the deletion candidate deletion section 166. On the other hand, if the selected effect total time period does not become more proximate to the slideshow reproduction time period when the candidate of deletion is deleted from the selected effects, then the deletion candidate deletion decision section 165 decides that the candidate of deletion should not be deleted from the selected effects and supplies the result of the decision to the scaling coefficient calculation section 167.

The deletion candidate deletion section 166 acquires the selected effects (vector data) from the effect selection section 162 based on the result of decision supplied thereto from the deletion candidate deletion section 166 and deletes the candidate of deletion from the selected effects. The deletion candidate deletion section 166 supplies a result of the deletion (vector data) to the scaling coefficient calculation section 167 and the correction section 168.

The scaling coefficient calculation section 167 acquires information of the slideshow reproduction time period from the slideshow reproduction time period setting section 161. Further, the scaling coefficient calculation section 167 acquires, when it acquires the result of decision from the deletion candidate deletion decision section 165, the selected effect total time period in the case wherein the candidate of deletion is not deleted from the selected effect total time period calculation section 163. Further, when the scaling coefficient calculation section 167 acquires the result of deletion from the deletion candidate deletion section 166, it acquires the selected effect total time period in the case wherein the candidate of deletion is deleted from the selected effect total time period calculation section 163. Then, the scaling coefficient calculation section 167 calculates the ratio of the slideshow reproduction time period to the selected effect total time period as a scaling coefficient. In other words, the scaling coefficient is a value obtained by dividing the slideshow reproduction time period by the selected effect total time period. The scaling coefficient calculation section 167 supplies the calculated scaling coefficient to the correction section 168.

The correction section 168 corrects the reproduction time period of the result of deletion supplied thereto from the deletion candidate deletion section 166 or the reproduction time period of each selected effect supplied from the effect selection section 162 using the scaling coefficient supplied thereto from the scaling coefficient calculation section 167. In particular, the correction section 168 corrects the selected effects (vector data) selected finally using the scaling coefficient to make the total reproduction time period of the selected effects coincide with the slideshow reproduction time period. The correction section 168 supplies a result of the correction (vector data) to the output vector data outputting section 169.

The output vector data outputting section 169 supplies the vector data supplied thereto from the correction section 168 as output vector data to the BGM reproduction section 144, extraction section 145 and effect image processing section 146.

When the output vector data production section 142 having such a configuration as described above executes the output vector data production process to produce output vector data, it adjusts the total reproduction time period of the selected effects so as to coincide with the slideshow reproduction time period (that is, the reproduction time period of the BGM) and produces the vector data then as output vector data. The output vector data production process executed by the output vector data production section 142 is described below with reference to a flow chart of FIG. 9.

After the output vector data production process is started, the slideshow reproduction time period setting section 161 determines a slideshow reproduction time period based on BGM reproduction time period information indicative of the reproduction time period of BGM at step S1. Usually, the slideshow reproduction time period is given by the reproduction time period of BGM.

After the slideshow reproduction time period is set, the effect selection section 162 selects an effect from among a plurality of effects included in a candidate list of a template corresponding to a play list at step S2. At step S3, the effect selection section 162 acquires reproduction time period information of the selected effect from vector data of the effect and supplies the information to the selected effect total time period calculation section 163. At step S4, the selected effect total time period calculation section 163 uses the reproduction time period of the effect supplied thereto to calculate a selected effect total reproduction time period. In particular, the selected effect total time period calculation section 163 adds the reproduction time period of the effect supplied thereto to a total reproduction time period of the effects supplied thereto till then (selected effect total reproduction time period till then) and sets a result of the addition as a new selected effect total reproduction time period. The selected effect total time period calculation section 163 supplies the calculated selected effect total reproduction time period to the effect selection section 162.

At step S5, the effect selection section 162 decides whether or not the selected effect total reproduction time period is longer than the slideshow reproduction time period. If the effect selection section 162 decides that the selected effect total reproduction time period is not longer than the slideshow reproduction time period, then it returns the processing to step S2 to repeat the processes at the steps beginning with step S2. On the other hand, if it is decided at step S5 that the selected effect total reproduction time period is longer than the slideshow reproduction time period, then the effect selection section 162 advances the processing to step S6.

In short, the processes at steps S2 to S5 are repeated to successively select an effect as a selected effect until after the selected effect total reproduction time period becomes longer than the slideshow reproduction time period.

At step S6, the deletion candidate selection section 164 selects that one of the selected effects with which the selected effect total reproduction time period when it is deleted is most proximate to the slideshow reproduction time period and determines the selected one effect as a deletion candidate.

At step S7, the deletion candidate deletion decision section 165 decides whether or not the selected effect total reproduction time period when the deletion candidate is deleted is more proximate to the slideshow reproduction time period than the selected effect total reproduction time period when the deletion candidate is not deleted. If the decision is affirmative, then the processing advances to step S8. At step S8, the deletion candidate deletion section 166 deletes the deletion candidate from the selected effects, whereafter the processing advances to step S9. On the other hand, if it is decided at step S7 that the selected effect total reproduction time period when the deletion candidate is deleted is not more proximate to the slideshow reproduction time period than the selected effect total reproduction time period when the deletion candidate is not deleted, then the deletion candidate deletion decision section 165 omits the process at step S8 and advances the processing to step S9.

At step S9, the scaling coefficient calculation section 167 calculates a scaling coefficient based on the selected effect total reproduction time period of the selected effects selected finally and the slideshow reproduction time period. At step S10, the correction section 168 corrects the information of the selected effects based on the scaling coefficient to correct the reproduction time period of each of the effects. At step S11, the output vector data outputting section 169 supplies the selected effects of a result of the correction as output vector data to the BGM reproduction section 144, extraction section 145 and effect image processing section 146.

After the output vector data are supplied, the output vector data production section 142 ends the output vector data production process.

FIG. 10 illustrates an example of correction of the selected effect total reproduction time period by the output vector data production process described above.

Figure 9:
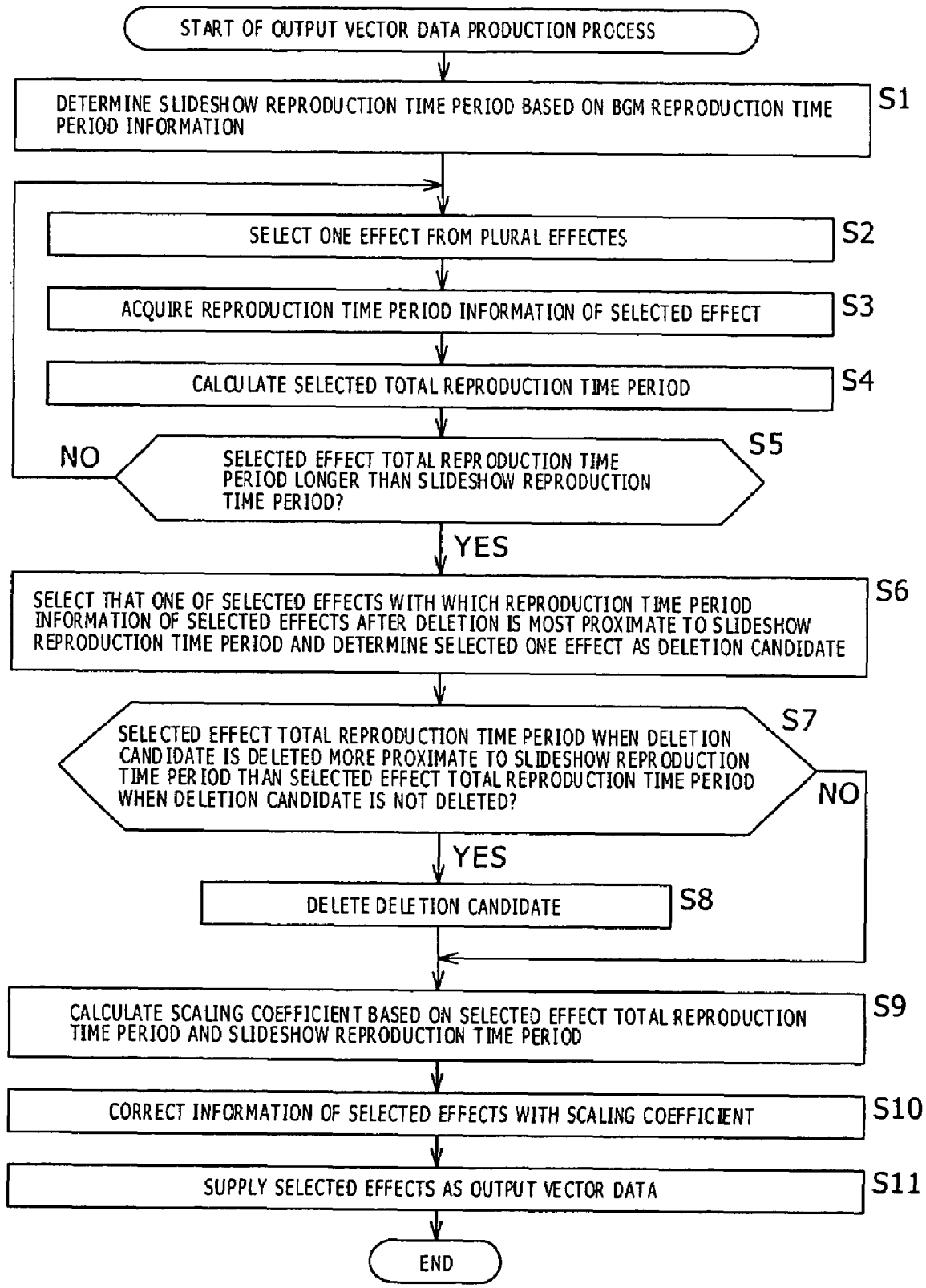
FIG. 9 is a flow chart illustrating an output vector data production process.
Figure 10A:
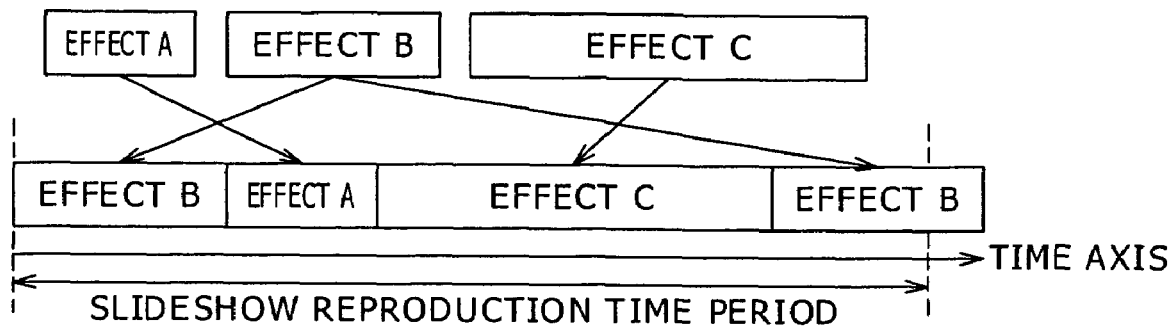
FIGS. 10A to 10D are diagrammatic views illustrating an example of production of a selection effect.

The output vector data production section 142 first selects an arbitrary effect and then successively adds an effect until a time period (slideshow reproduction time period) in which the slideshow is to be ended is exceeded as seen in FIG. 10A. In FIG. 10A, effects A to C are successively selected in order of the effect B, effect A, effect C and effect B. This process corresponds to the processes at steps S2 to S5 of FIG. 9.

Figure 10B:
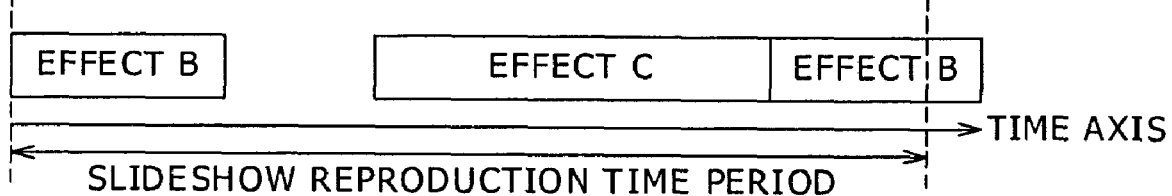

Then, if the reproduction time period approaches the slideshow reproduction time period when one of the selected effects is deleted as seen in FIG. 10B, then the output vector data production section 142 deletes the effect. However, if the reproduction time period is more proximate to the slideshow reproduction time period when any of the selected effects is not deleted, then deletion of any effect is performed. In FIG. 10B, the effect A is deleted. This process corresponds to the processes at steps S6 to S8 in FIG. 9.

Figure 10C:
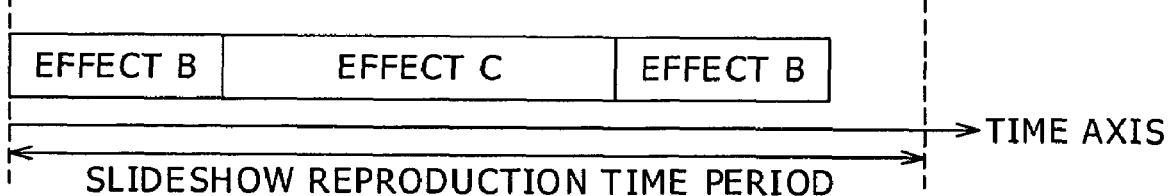

Then, the output vector data production section 142 moves the remaining effects to eliminate the space formed by the deletion as seen in FIG. 10C. In the case of FIG. 10C, the selected effects are re-constructed such that the space at the deleted effect A is filled up so that the selected effects are reproduced successively in order of the effect B, effect C and effect B. This process corresponds to the process at step S8 of FIG. 9.

Figure 10D:
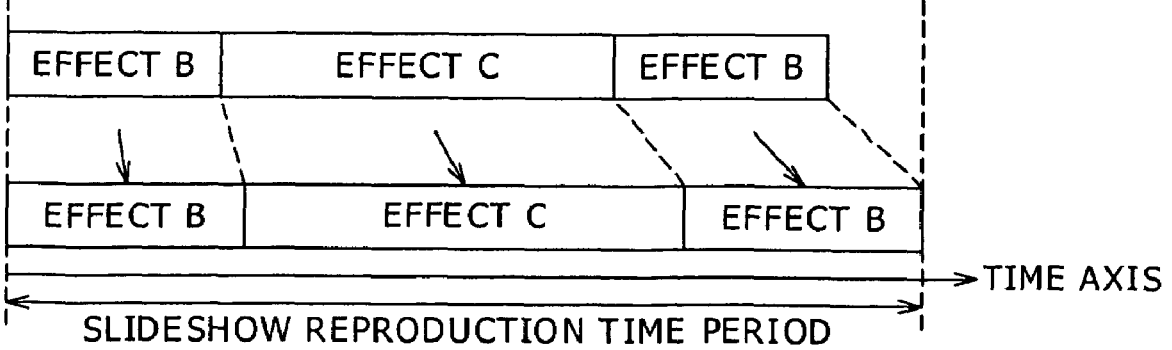

For the selected effects in this condition, the output vector data production section 142 calculates a scaling coefficient in order to make the selected effect total reproduction time period coincide with the slideshow reproduction time period and multiplies the reproduction time periods of the effects by the scaling factor as seen in FIG. 10D. In other words, the reproduction time periods of the first time effect B, effect C and second time effect B are corrected with the scaling coefficient. This process corresponds to the processes at steps S9 to S11 in FIG. 9.

The correction of the reproduction time period of an effect is performed in such a manner as illustrated in FIG. 11. Referring to FIG. 11, in vector data of each effect, a manner of variation of each parameter is associated with a frame and designated as a table as seen in Table 181 and Table 182.

Table 181 represents table information wherein the frame number and the amount of movement of an object in the direction of the X coordinate axis are associated with each other, and indicates that the X coordinate of the reference position of the object corresponding to Table 181 moves from "1" to "100" while the frame changes from the "1st" frame to the "300th" frame.

Meanwhile, Table 182 represents table information wherein the frame number and the amount of movement of an object in the direction of the Y coordinate axis are associated with each other, and indicates that the Y coordinate of the reference position of the object corresponding to Table 182 moves from "1" to "50" while the frame changes from the "1st" frame to the "400th" frame.

The correction section 168 multiplies the frame values of such information as described just above by a scaling coefficient 183. As a result, Table 181 changes to Table 184, and Table 182 changes to Table 185. In FIG. 11, since the value of the scaling coefficient 183 is "1.1", the movement from the "1st" frame to the "300th" frame indicated in Table 181 is corrected so as to become the movement from the "1st" frame to the "330th" frame in Table 184. Similarly, the movement from the "1st" frame to the "400th" frame indicated in Table 182 is corrected so as to become the movement from the "1st" frame to the "440th" frame in Table 185.

As the frame numbers of the tables are corrected in such a manner as described above, the reproduction time periods of the effects are corrected.

It is to be noted that the parameter represented by the vector data may be any parameter and, for example, may be the size (scale) of the object in the X direction or the Y direction, the rotational angle (0 to 360 degrees) of the object, the color (color components of red, blue and green) or the concentration (transparency) of the object, the substance of deformation or the like.

As described above, the output vector data production section 142 can correct the total reproduction time period of selected effects to an arbitrary time period using a scaling coefficient. In other words, the output vector data production section 142 can make the reproduction time period of images coincide with the reproduction time period of BGM which is an arbitrary time period and can produce output vector data having such a reproduction time period as just described. Consequently, the information processing apparatus 1 can reproduce a slideshow file for an arbitrary time period wherein the reproduction time periods of images and sound coincide with each other. In other words, the information processing apparatus 1 can provide the user with high-quality slideshow wherein the reproduction time periods of images and sound coincide with each other irrespective of the reproduction time period of a tune selected as BGM. Consequently, the information processing apparatus 1 can enhance the degree of satisfaction of the user.

Now, a particular example of use of such an output data production process as described above is described.

First, a menu screen displayed on the TV2 by the output control section 136 is described.

Figure 12:
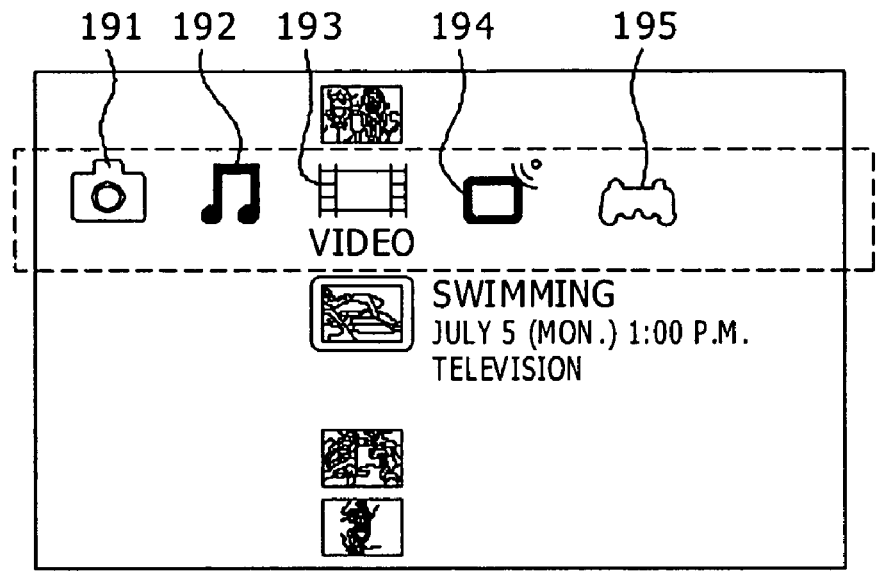
FIG. 12 is a schematic view showing an example of a menu screen.
Figure 13:
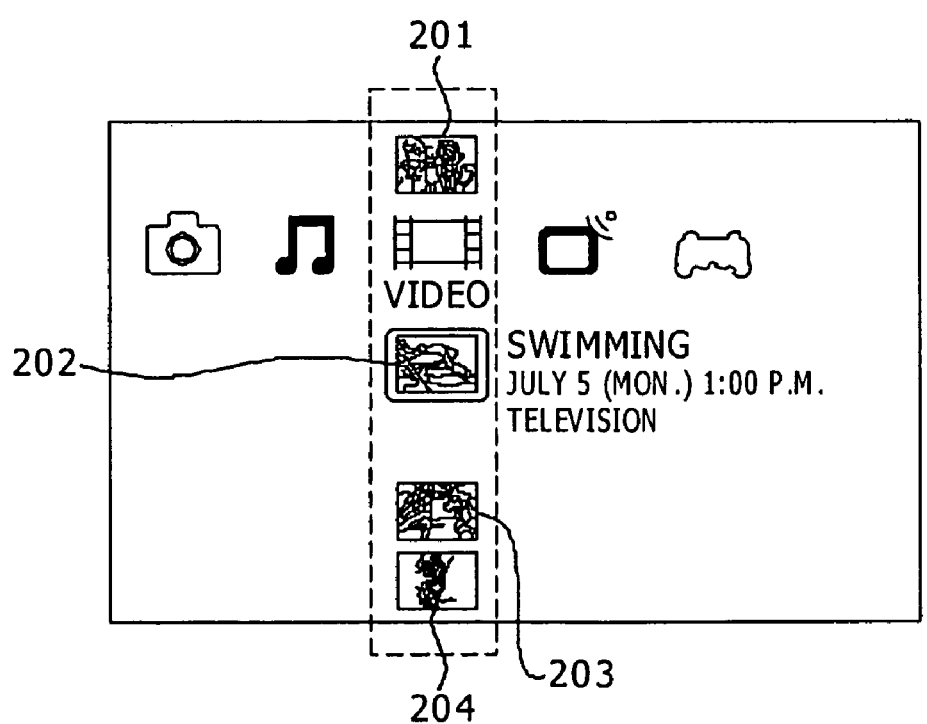
FIG. 13 is a similar view but showing another example of the menu screen.

FIGS. 12 and 13 show an example of a menu screen.

On the menu screen, category icons 191 to 195 which individually represent different categories are displayed in an array in a horizontal direction of the screen and shown surrounded by a broken line in FIG. 12. Further, content icons (video content icons) 201 to 204 which represent contents belonging to that one of the categories which is selected by the user are displayed in an array in a vertical direction of the screen perpendicular to the array direction of the category icons 191 to 195 and shown surrounded by a broken line in FIG. 13. It is to be noted that the broken lines in FIGS. 12 and 13 are not actually displayed on the menu screen.

In the example of FIGS. 12 and 13, the category icon 191 representative of the category of "photo", the category icon 192 representative of the category of "music", the category icon 193 representative of the category of "video", the category icon 194 representative of the category of "television" and the category icon 195 representative of the category of "game" are displayed in order in an array in the rightward direction from the left end of the screen.

Further, in the example of FIGS. 12 and 13, "video" is selected by the user, and the content icons 201 to 204 representative of video contents which belong to "video" are displayed in an array in a vertical direction. From among the content icons 201 to 204, the content icon 202 is currently selected, and a title and so forth of a video content represented by the content icon 202 is displayed alongside the content icon 202.

On such a menu screen as described above, the user can basically select a category by an operation in a horizontal direction (leftward or rightward button) of the remote controller and can select a content which belongs to the selected category by an operation in a vertical direction (upward or downward button).

In response to an operation by the user, the category icons 191 to 195 (category icons 191 to 195 and category icons representative of other categories which are not displayed in FIGS. 12 and 13) and the content icons 201 to 204 (content icons 201 to 204 and other content icons which are not displayed in FIGS. 12 and 13) are moved collectively as a whole and displayed.

Figure 14:
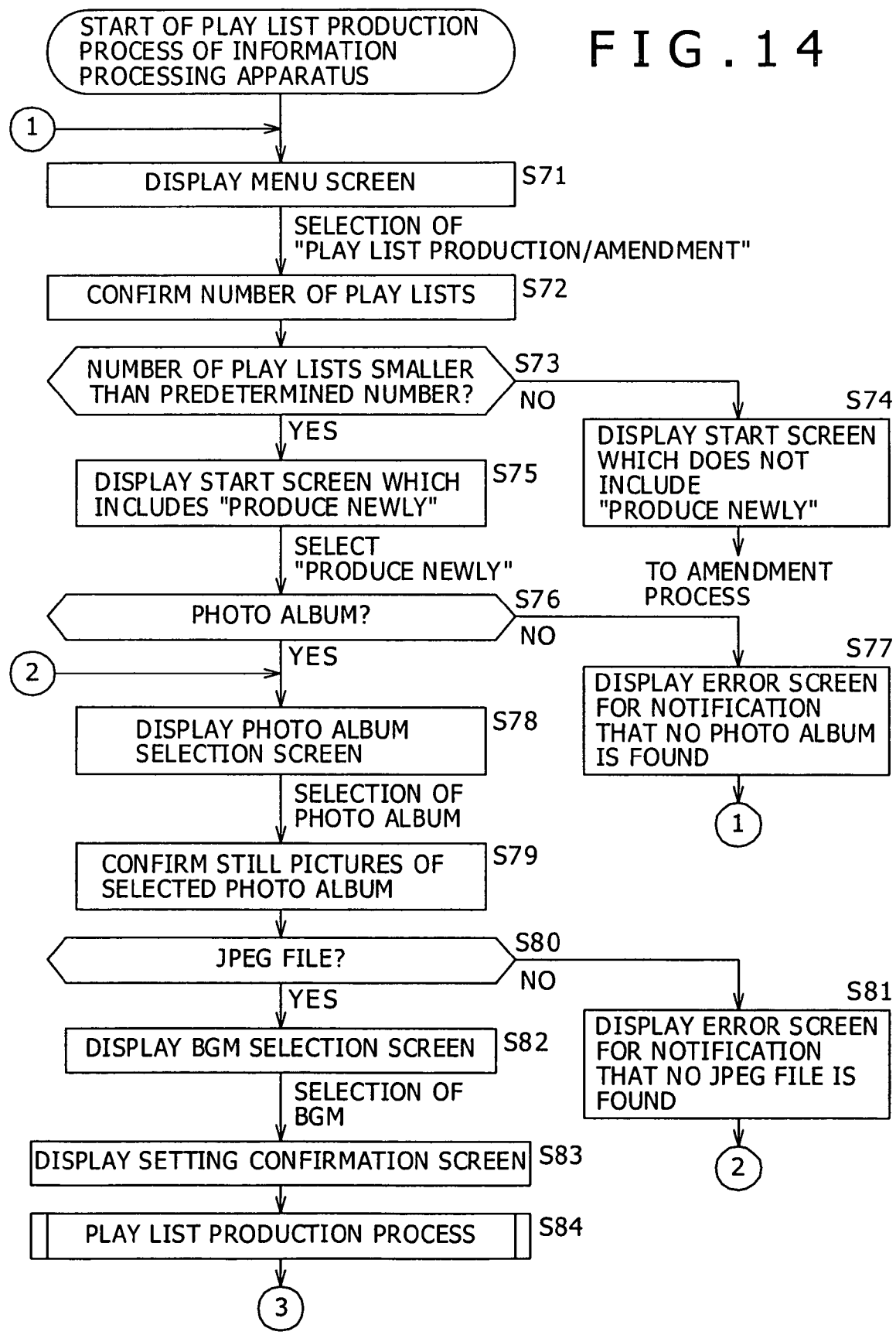
FIGS. 14 to 16 are flow charts illustrating a play list production process of the information processing apparatus.
Figure 15:
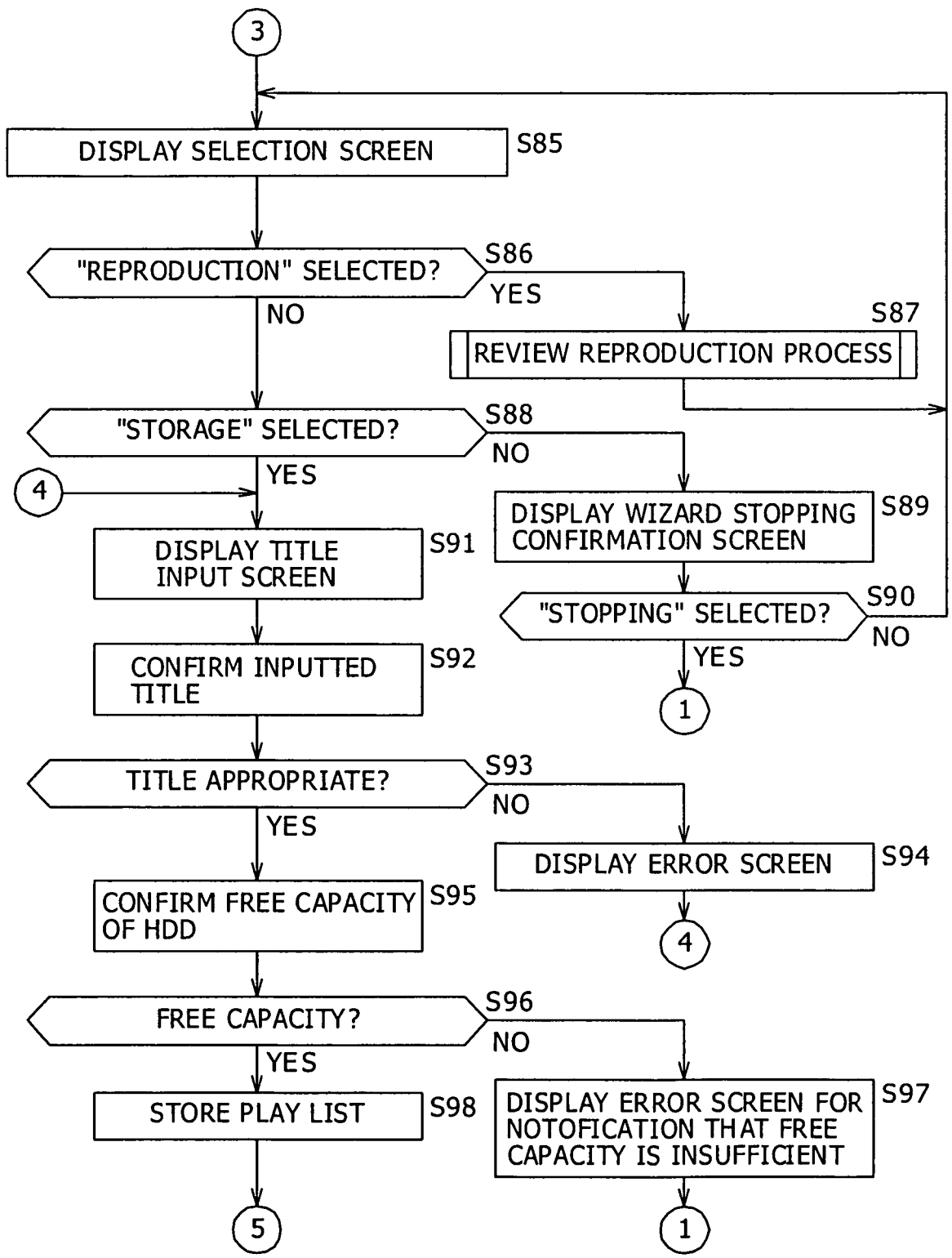

For example, if the user depresses the leftward button only once in the state of FIG. 12 wherein "video" is selected, then the category icons 191 to 195 move as a whole in the rightward direction, and the category icon 192 is displayed at the position at which the category icon 193 is displayed in the state of FIGS. 14 and 15 and the category icon 191 is displayed at the position at which the category icon 192 is displayed in the state of FIGS. 14 and 15.

Similarly, the category icon 193 is displayed at the position at which the category icon 194 is displayed in the state of FIGS. 14 and 15, and the category icon 194 is displayed at the position at which the category icon 195 is displayed in the state of FIGS. 14 and 15. Furthermore, a category icon of a different category which is arrayed leftwardly of the category icon 191 and is not shown in FIGS. 14 and 15 is displayed at the position at which the category icon 191 is displayed in the state of FIGS. 12 and 13.

Consequently, "music" is selected in place of "video", and content icons representative of audio contents which belong to "music" are displayed in an array in a vertical direction.

On the other hand, if the user depresses the leftward button only once in the state of FIG. 12, then the category icons 191 to 195 move as a whole in the rightward direction opposite to that where the leftward button is depressed, and "television" is selected.

Further, for example, if the user depresses the upward button only once in the state of FIG. 13 wherein the content icons 201 to 204 are displayed, then the content icons 201 to 204 move as a whole in the upward direction, and the content icon 202 is displayed at the position at which the content icon 201 is displayed in the state of FIGS. 14 and 15 and the content icon 203 is displayed at the position at which the content icon 202 is displayed in the state of FIGS. 12 and 13.

Similarly, the content icon 204 is displayed at the position at which the content icon 203 is displayed in the state of FIGS. 12 and 13, and a category icon which is disposed downwardly of the content icon 204 and is not shown in FIGS. 12 and 13 is displayed at the position at which the content icon 204 is displayed in the state of FIGS. 12 and 13.

Consequently, changeover from the state wherein the content icon 202 is selected to the state wherein the content icon 203 is selected occurs. At this time, a title and so forth of a video content represented by the content icon 203 are displayed alongside the content icon 203.

On the other hand, if the user depresses the downward button only once in the state of FIG. 12, then the content icons 201 to 204 entirely move in the downward direction opposite to that where the upward button is selected, and the content icon 201 is selected.

By selecting a category and a content in such a manner as described above and then depressing a determination button of the remote controller, the user can cause a sub menu, on which operations which can be performed using the currently selected content are displayed in a list, to be displayed. The user can select, from within the sub menu displayed when a certain content is displayed, reproduction, copying, editing, deletion or the like of the currently selected content.

Now, a play list production process executed by the information processing apparatus 1 is described with reference to flow charts of FIGS. 14 to 16.

First, at step S71 of FIG. 16, the output control section 136 causes such a menu screen as described hereinabove with reference to FIGS. 12 and 13 to be displayed. If "photo" is selected on the menu screen, then an icon representative of a wizard which is used to produce or modify a play list is displayed alongside the content icon representative of the photo album.

Figure 17:
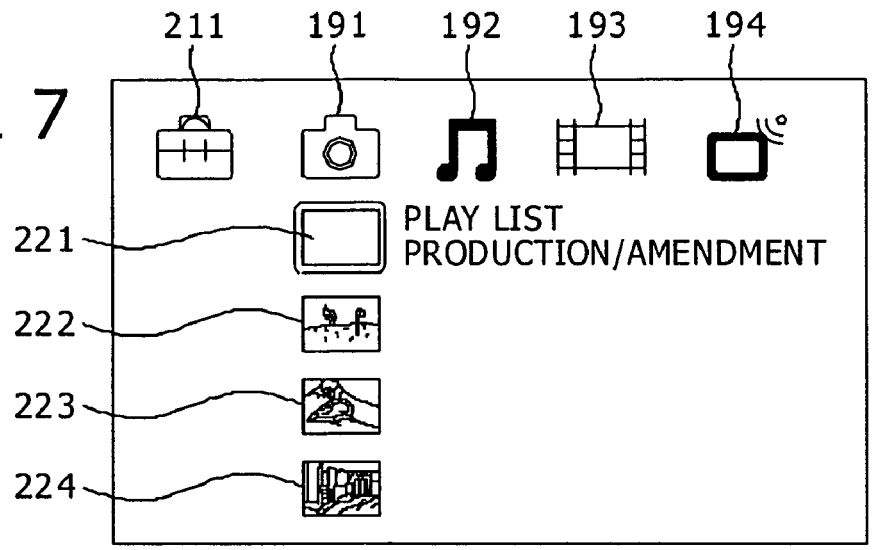
FIG. 17 is a schematic view showing an example of a display screen.

FIG. 17 shows an example of the menu screen displayed at step S71 of FIG. 14. The same icons as those in FIG. 12 are referenced by the same numbers.

FIG. 17 shows the menu screen in a state wherein "photo" is selected. Referring to FIG. 17, an icon 221 representative of a wizard and content icons 222 to 224 representative of photo albums are displayed below the category icon 191. In FIG. 17, the icon 221 is selected, and characters of "production/ amendment of play list" are displayed on the right side of the icon 221. It is to be noted that, in FIG. 17, a category icon 211 representative of a category of various settings is displayed on the left side of the category icon 191.

When the determination button is selected by the user in the state wherein the icon 221 is selected on the menu screen of FIG. 17 (when an instruction to activate the wizard is issued), the processing advances to step S72.

At step S72, the content management section 131 confirms the number of play lists produced already and stored in the HDD 120. Thereafter, the processing advances to step S73, at which the content management section 131 decides whether or not the number of play lists is equal to or smaller than a predetermined number. In particular, in the present example, an upper limit is set to the number of play lists, and where a number of play lists equal to the upper limit number are produced already, a play list cannot be produced any more.

If the content management section 131 decides at step S73 that the number of play lists is not smaller than the predetermined number (reaches the upper limit), then it notifies the output control section 136 of this. Thereafter, the processing advances to step S74.

At step S74, the output control section 136 causes a start screen, on which production of a new play list cannot be selected, to be displayed.

Although the start screen is not shown in the drawings, it includes, for example, a display of a message "A work may be produced from photographs stored in an album or a work produced already may be modified . . . " and another display, below the first mentioned display, of characters "to be modified" which is selected when modification to a play list produced already is to be performed.

Figure 18:
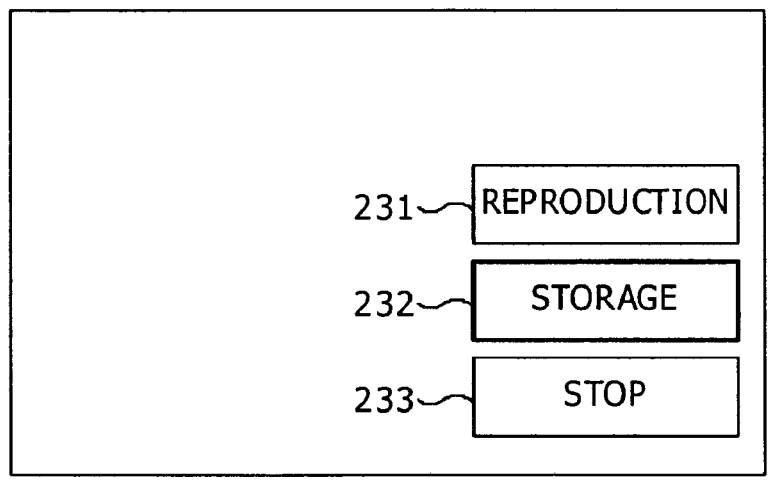
FIGS. 18 to 21 are schematic views showing different examples of the display screen.

The user can perform, for example, modification to a play list produced already by depressing the determination button of the remote controller in the state wherein the characters of "to be modified" are selected (displayed in a reverse color). If the characters of "to be modified" are selected, then the play list production process illustrated in FIGS. 16 to 18 is ended, and a play list modification process is started. Description of the play list modification process is omitted herein.

On the other hand, if the content management section 131 decides at step S73 that the number of play lists is equal to or smaller than the predetermined number, then it notifies the output control section 136 of this. Thereafter, the processing advances to step S75.

At step S75, the output control section 136 causes another start screen, on which production of a new play list can be selected, to be displayed.

Although the start screen in this instance has a configuration basically similar to that of the start screen described hereinabove, for example, characters of "to be produced newly" are displayed above the characters of "to be modified". When the determination button is depressed in a state wherein the characters of "to be produced newly" are selected by the user, the processing advances to step S76 to start a new play list production process.

At step S76, the content management section 131 decides whether or not a photo album is stored in the HDD 120. If it is decided that a photo album is not stored, then the content management section 131 notifies the output control section 136 of this. Thereafter, the processing advances to step S77.

At step S77, the output control section 36 causes an error screen, which notifies that there is no photo album, to be displayed.

On the error screen, for example, a message of "An album from which a play list can be produced is not found. The production/modification of a play list is ended." is displayed. Since, in the information processing apparatus 1, selection of a still picture to be reproduced by the slideshow is performed by selection of a photo album as described hereinabove, when there is no photo album, the user cannot select a still picture of an object of reproduction. Thereafter, the processing returns to step S71 so that the processes at the steps beginning with step S71 are performed.

On the other hand, if it is decided at step S76 that a photo album is stored in the HDD 120, then the content management section 131 notifies the output control section 136 of this and outputs information of the photo album (title, image of an icon and so forth of the photo album) stored in the HDD 120 to the output control section 136. Thereafter, the processing advances to step S78.

At step S78, the output control section 136 causes a photo album selection screen to be displayed.

On the selection screen, for example, three icons representative of different photo albums are displayed. On the right side of the icons, for example, "album 2" which is a title of a photo album and "2004/6/2 1:00:32 AM" which is the date and hour of the production (date and hour of fetching) are displayed. The user can select a desired one of the photo albums from within the selection screen.

When a photo album is selected, the content management section 131 confirms the format of still pictures stored in the selected photo album at step S79. Thereafter, the processing advances to step S80, at which the content management section 131 decides a still picture (JPEG file) which is compressed in accordance with the JPEG (Joint Photographic Expert Group) system is included in the photo album selected by the user. In other words, in the present example, a still picture of a processing object is a JPEG file.

If the content management section 131 decides at step S80 that no JPEG file is included in the photo album selected by the user, then it notifies the output control section 136 of this. Thereafter, the processing advances to step S81.

At step S81, the output control section 136 displays an error screen, which is for notification that no JPEG file is found, to be displayed.

On the error screen, for example, a message of "A file which can be utilized for production of a play list is not found. Please select another album." is displayed. After this screen is displayed, the processing returns to step S78 so that selection of a photo album would be performed again.

On the other hand, if the content management section 131 decides at step S80 that a JPEG file is included in the photo album selected by the user, then it notifies the output control section 136 of this. Thereafter, the processing advances to step S82.

At step S82, the output control section 136 causes a selection screen for selection of a tune of BGM to be displayed. Information of the tune of BGM such as the title and an icon is supplied from the BGM/template management section 132.

On the selection screen, for example, three icons representative of different tunes are displayed, and the titles of the tunes are displayed on the right side of the icons. The user can select a desired tune from within the selection screen and use the tune as BGM upon slideshow. Since tunes of BGM and templates are coordinated with each other as described hereinabove, selection of a tune here signifies selection also of a template.

When a tune of BGM is selected, the output control section 136 causes, at step 83, a confirmation screen of the substance of the selections till then (setting relating to a play list to be produced) to be displayed.

On the confirmation screen, for example, "guide to travel" which is a title of a photo album selected by the user, "Music 1" which is a title of the tune of BGM selected by the user, "2:00" which is a period of reproduction time of "Music 1" and so forth are displayed. The user can confirm the substance of the setting and select whether or not a play list should be produced based on the setting".

If an instruction to produce a play list is issued, then a play list production process is performed at step S84. Through the play list production process, such a play list as shown in FIG. 3 is produced in response to selection by the user by the play list production section 135. Details of the play list production process are hereinafter described with reference to a flow chart of FIG. 22. It is to be noted that the play list produced here does not have the "play list name" (FIG. 3) set thereto as yet.

As described above, the user can produce a play list principally by two operations including an operation of selecting a photo album and another operation of selecting a tune of BGM.

When a play list is produced, the output control section 136 causes a selection screen, on which preview reproduction of the play list or storage of the play list can be selected, to be displayed at step S85 (FIG. 15).

FIG. 18 shows an example of the display screen displayed at step S85 of FIG. 15.

On the selection screen of FIG. 18, a reproduction button 231 to be operated in order to perform preview reproduction of the play list produced at step S84, a storage button 232 to be operated in order to store the play list and a stop button 233 to be operated when later processing is to be stopped are displayed.

At step S86, the play list production section 135 decides whether or not the reproduction button 231 of FIG. 18 is operated to select the preview reproduction. If the play list production section 135 decides that the preview reproduction is selected, then it outputs the play list produced by the process at step S84 to the reproduction section 134.

At step S87, a preview reproduction process is performed to reproduce the play list produced by the process at step S84. Consequently, the user can confirm what the still pictures to be reproduced in accordance with a reproduction procedure defined by the play list are. Details of the preview reproduction process are hereinafter described with reference to FIG. 23. When the preview reproduction process comes to an end, the processing returns to step S85 so that the processes at the steps beginning with step S86 are performed.

On the other hand, if the play list production section 135 decides at step S86 that preview reproduction of a play list is not selected, then the processing advances to step S88, at which the play list production section 135 decides whether or not the storage button 232 is operated to select storage of a play list.

If the play list production section 135 decides at step S88 that storage of a play list is not selected, then it decides that the stop button 233 is operated and notifies the output control section 136 of this. Thereafter, the processing returns to step S89.

At step S89, the output control section 136 causes a stopping confirmation screen of the wizard to be displayed.

On the stopping confirmation screen, for example, a message of "The production/modification of a play list is stopped. OK?" is displayed, and characters of "Yes" and "No" are displayed below the message. The user can end the production of a play list by selecting the characters of "Yes" but can continue the production of a play list by selecting the characters of "No".

At step S90, the output control section 136 decides whether or not stopping of production of a play list is selected. If the output control section 136 decides that the stopping is selected, then the processing returns to step S71 so that the processes at the steps beginning with step S71 are executed repetitively. On the other hand, if the output control section 136 decides at step S90 that the stopping is not selected, then the processing returns to step S85 so that the processes at the steps beginning with step S85 are executed.

On the other hand, if the play list production section 135 decides at step S88 that storage of a play list is selected, then it notifies the output control section 136 of this, whereafter the processing advances to step S91. When storage of a play list is selected, the play list produced by the process at step S84 is outputted from the play list production section 135 to the content management section 131.

At step S91, the output control section 136 causes an input screen of a title of a play list (play list name) to be displayed.

On the input screen, for example, a title input place at which a title inputted by the user is to be displayed is displayed, and a keyboard (software keyboard) is displayed below the title input place. The user can operate, for example, the key board to input a title of the play list.

When a title of the play list is inputted, the content management section 131 confirms the inputted title at step S92, whereafter the processing advances to step S93, at which the content management section 131 decides whether or not the title is appropriate.

If the content management section 131 decides at step S93 that the inputted title is not appropriate, then it notifies the output control section 136 of this, whereafter the processing advances to step S94. It is decided that the title is not appropriate, for example, when one of the play lists set already has the same title or when the inputted title includes a character whose use is inhibited or in a like case.

At step S94, the output control section 136 causes an error screen to be displayed which is for the notification that the inputted title is inappropriate.

For example, on the error screen which is displayed where a play list having the same title set thereto already exists, a message of "The inputted name is overlapping or illegal. Please change the title name." is displayed.

On the other hand, on the error screen which is displayed when the inputted title includes a character whose use is inhibited, a message of "The following characters cannot be used." and those characters which cannot be used are displayed in addition to a message same as the message displayed on the error screen described above.

After the error screen for the notification that the title is inappropriate is displayed, the processing returns to step S91, at which inputting of a title is performed again.

On the other hand, if the content management section 131 decides at step S93 that the inputted title is appropriate, then the processing advances to step S95, at which the free capacity of the HDD 120 is confirmed.

At step S96, the content management section 131 decides whether or not the HDD 120 has a free capacity sufficient to store the play list. If the content management section 131 decides that the HDD 120 does not have a sufficient free capacity, then it notifies the output control section 136 of this. Thereafter, the processing advances to step S97.

At step S97, the output control section 136 causes an error screen for the notification that the free capacity is insufficient to be displayed.

On the error screen, for example, a message of "The capacity of the hard disk is insufficient. Please delete unnecessary titles, tracks or photos. The production/modification of the play is ended." is displayed.

After the error screen for the notification that the free capacity is insufficient, the processing returns to step S71 so that the processes at the steps beginning with step S71 are executed.

On the other hand, if the content management section 131 decides at step S96 that the free capacity sufficient to store the play list remains in the HDD 120, then the processing advances to step S98, at which it stores the produced play list as a content which belongs to "photo". Consequently, an icon of the stored play list is displayed for "photo" of the menu screen.

Figure 19:
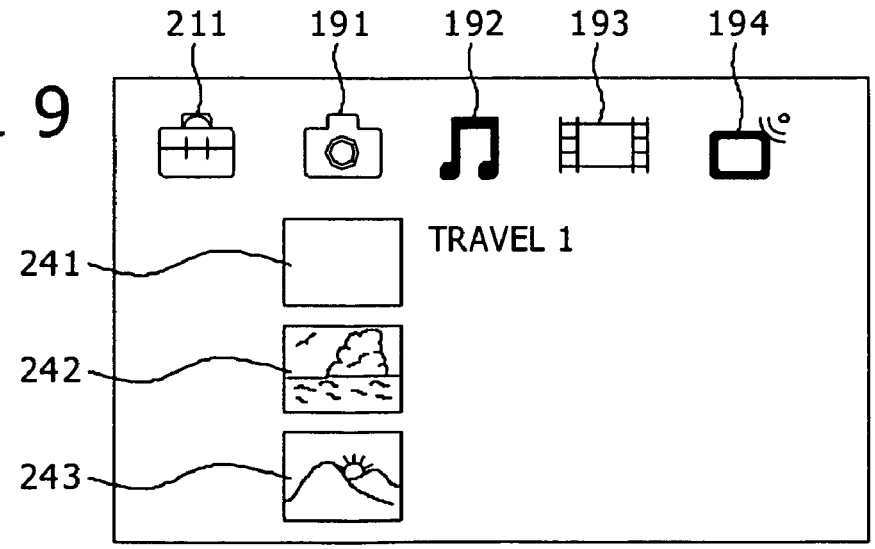

FIG. 19 shows an example of the menu screen on which the play list is added as a content which belongs to "photo".

On the screen of FIG. 19, category icons 191 to 194 and a category icon 211 are displayed in a horizontal array, and the category which is selected currently is "photo". When "photo" is selected, an icon 241 representative of the play list stored by the process at step S88 of FIG. 15 is displayed below the category icon 191 as seen in FIG. 19. On the right side of the icon 241, "travel" which is the title of the play list is displayed.

In this manner, the play list is displayed as a content of "photo" similarly to another still picture content (photo album) on the menu screen. Accordingly, the user can select the play list in a similar feeling as upon selection of another still picture content and perform reproduction and so forth of the play list. On the screen of FIG. 19, content icons 242 and 243 displayed below the icon 241 represent photo albums. It is to be noted that not an icon representative of a play list may be displayed alongside an icon representative of a photo album but one folder may be displayed alongside an icon representative of a photo album while an icon of a produced play list is displayed in a hierarchy lower than that of the folder.

When the play list is stored, the content management section 131 confirms at step S99 (FIG. 16) whether or not recording of a television program is being performed by the recording/reproduction section 117.

As described hereinabove, in the information processing apparatus 1, output vector data which are equivalent to a result of reproduction of a play list can be stored as a content (slideshow content), and it is confirmed here whether or not production of a slideshow content is possible. When the recording/reproduction section 117 which performs MPEG2 encoding is executing MPEG2 encoding such as recording of a television program, production of a slideshow content which is considered as a content of the same type is impossible. Naturally, it is possible to eliminate such restriction. In other words, it is otherwise possible to omit the confirmation here.

At step S100, the content management section 131 decides whether or not the recording/reproduction section 117 is executing recording. If the content management section 131 decides that the recording/reproduction section 117 is executing recording, then it notifies the output control section 136 of this, whereafter the processing advances to step S101.

At step S101, the output control section 36 causes an error screen for the notification that production of a slideshow content cannot be performed to be displayed.

On the error screen, for example, a message of "The play list is stored. Video production cannot be carried out during recording. Please perform video production from the play list after the recording is ended. The play list production/modification is ended." is displayed. The "video" in the message signifies a "slideshow content".

After the error screen for the confirmation that a slideshow content cannot be produced is displayed, the processing returns to step S71 so that the processes at the steps beginning with step S71 are executed. The user can select the icon of the play list displayed as a content belonging to "photo" from within the menu screen and perform production of a slideshow content from a sub menu (a list of operations which can be performed using the play list) displayed in response to the selection of the icon. The "Please perform video production from the play list after the recording is ended." from within the message displayed on the error screen represents this.

On the other hand, if the content management section 131 decides at step S100 that the recording/reproduction section 117 is not executing recording, that is, production of a slideshow content is possible, then the processing advances to step S102. At step S102, the content management section 131 confirms the number of video contents (including television programs and slideshow contents) stored in the HDD 120. In particular, in the present example, an upper limit is set to the number of video contents which can be stored in the HDD 120, and when a number of video contents equal to the upper limit number are stored already, storage of any more video content is inhibited.

At step S103, the content management section 131 decides whether or not the number of video contents is equal to or smaller than a predetermined number. If the content management section 131 decides that the number of video contents is not smaller than the predetermined number (reaches the upper limit number), then it notifies the output control section 136 of this, and the processing advances to step S104.

At step S104, the output control section 136 causes an error screen for the notification that production (storage) of a slideshow content is impossible to be displayed.

On the error screen, a message of "Full titles exist. Please delete unnecessary titles, tracks and photos. The play list production/modification is ended." is displayed.

After the error screen for the notification that production of a video content is impossible is displayed, the processing returns to step S71 so that the processes at the steps beginning with step S71 are executed.

On the other hand, if the content management section 131 decides at step S103 that the number of video contents is equal to or smaller than the predetermined number, then it notifies the output control section 136 of this, and the processing advances to step S105.

At step S105, the output control section 136 causes a selection screen for the selection of whether or not the slideshow content should be stored to be displayed.

Figure 16:
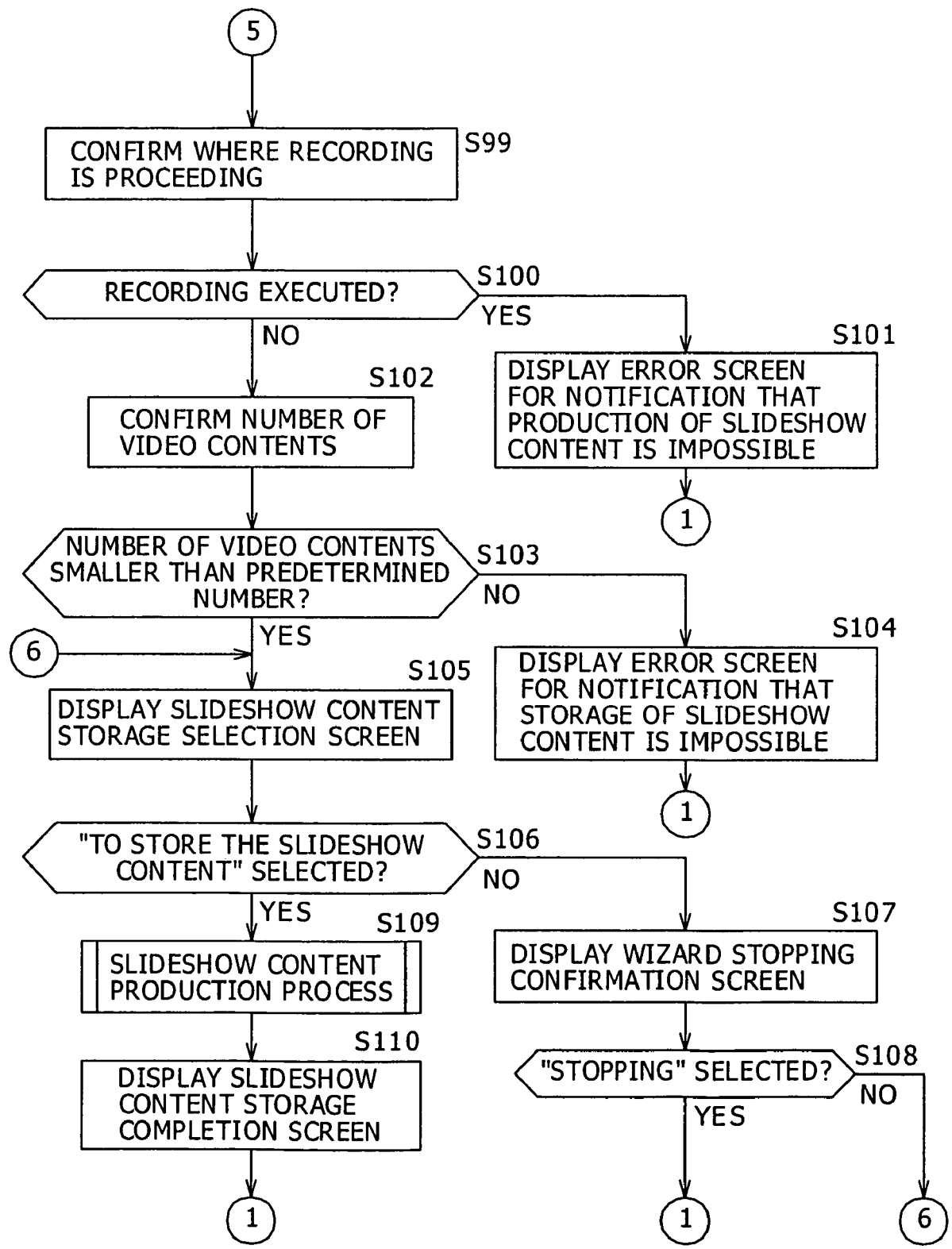
Figure 20:
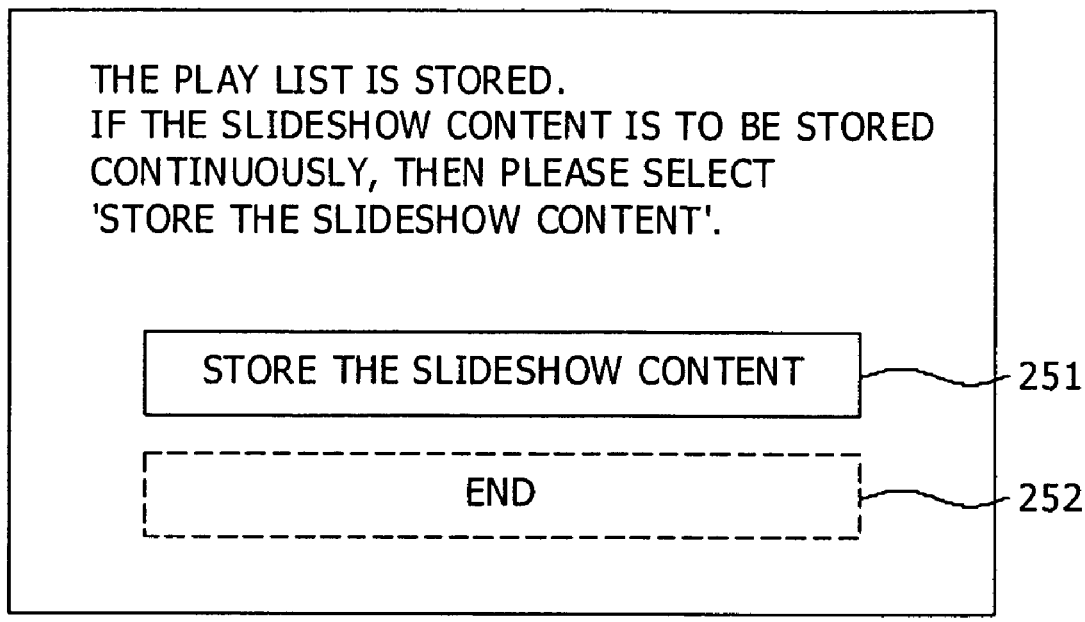

FIG. 20 shows an example of the selection screen displayed at step S105 of FIG. 16.

On the screen of FIG. 20, a message of "The play list is stored. If the slideshow content is to be stored continuously, then please select 'store the slideshow content'." is displayed.

Figure 22:
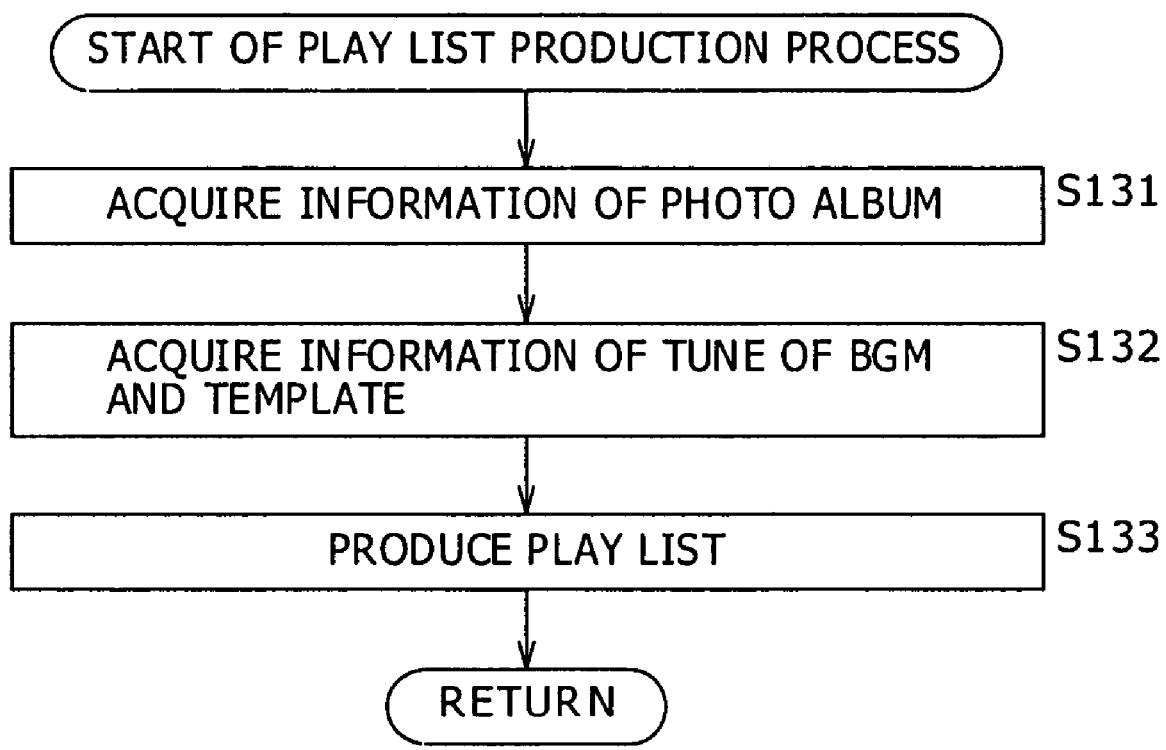
FIG. 22 is a flow chart illustrating details of the play list production process.

Further, at a lower portion of the screen of FIG. 22, a GUI button 251 on which characters "store the slideshow content" to be selected when a slideshow content is to be stored and another GUI button 252 on which characters of "end" for ending the process without storing the slideshow content are displayed. The user can store the slideshow content into the HDD 120 by operating the remote controller to select the GUI button 251 on which the characters "Store the slideshow content" are displayed.

At step S106, the content management section 131 decides whether or not the characters "Store the slideshow content" are selected from within the selection screen of FIG. 22. If the content management section 131 decides that the characters "store the slideshow content" are not selected, that is, if the content management section 131 decides that the characters "End" are selected from within the selection screen of FIG. 20, then it notifies the output control section 136 of this. Thereafter, the processing advances to step S107.

At step S107, the output control section 136 causes a stopping confirmation screen of the wizard to be displayed. The stopping confirmation screen displayed here is same as the screen displayed at step S89 of FIG. 15.

At step S108, it is decided whether or not stopping of the wizard is selected from within the stopping confirmation screen. If it is decided that the stopping is selected, then the processing returns to step S71 so that the processes at the steps beginning with step S71 are executed. On the other hand, if it is decided at step S108 that the stopping of the wizard is not selected, then the processing returns to step S105, at which it is selected again whether or not the slideshow content should be stored.

On the other hand, if the content management section 131 decides at step S106 that the characters of "store the slideshow content" are selected from within the selection screen of FIG. 20, then the processing advances to step S109.

At step S109, a slideshow content production process is performed. The slideshow content produced by the slideshow content production process is outputted from the slideshow content production section 133 to the content management section 131 and stored into the HDD 120. Details of the slideshow content production process are hereinafter described with reference to a flow chart of FIG. 24.

At step S110, the output control section 136 causes a storage completion screen for the notification that storage of the slideshow content is completed to be displayed.

On the storage completion screen, for example, a message for the notification that the slideshow content produced by the process at step S109 is stored as one of contents which belong to "video" is displayed.

Consequently, to "video" on the menu screen, an icon representative of the slideshow content is displayed additionally.

Figure 21:
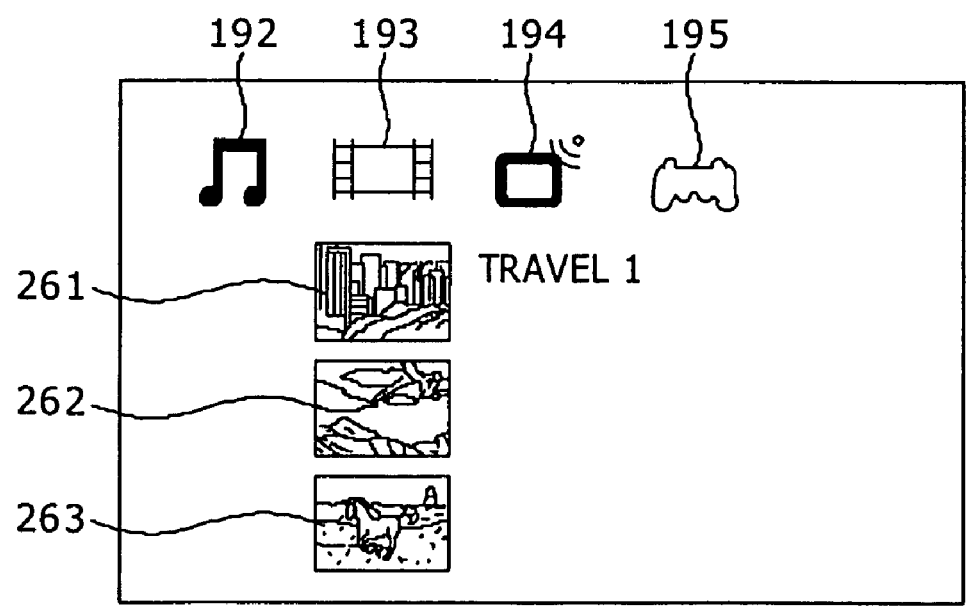

FIG. 21 shows an example of the menu screen on which an icon representative of the slideshow content is added as an icon of a content which belongs to "video".

On the screen of FIG. 21, category icons 192 to 195 are displayed in a horizontal array, and the currently selected category is "video". At this time, an icon 261 representative of the slideshow content is displayed below the category icon 193 as seen in FIG. 21.

On the right side of the icon 261, "Travel 1" which is a title of the slideshow content is displayed. In particular, the slideshow content represented by the icon 261 of FIG. 21 is produced from a result of reproduction of the play list represented by the icon 241 of FIG. 19, and the same title as that of the play list represented by the icon 241 of FIG. 19 is set to the slideshow content.

In this manner, the slideshow content produced from a result of reproduction of the play list is displayed as a content belonging to "video" similarly to the other video contents such as a television program on the menu screen. Accordingly, the user can select the slideshow content in a same feeling as that upon selection of any other video content and perform reproduction and so forth of the slideshow content. On the screen of FIG. 21, content icons 262 and 263 displayed below the icon 261 represent video contents of television programs.

It is to be noted that the user may write (record) the slideshow content on the optical disk 125 or transmit the slideshow content to another apparatus through the communication section 121 similarly to any other video content of a television program. Accordingly, the user can load the optical disk 125 on which the slideshow content is recorded into another player or the like to enjoy the slideshow content.

In such a series of processes relating to a slideshow file as described above, the output vector data production process described hereinabove with reference to the flow chart of FIG. 9 is executed. Consequently, the information processing apparatus 1 can reproduce a slideshow file for an arbitrary period of time wherein the reproduction time periods of images and sound coincide with each other. In other words, the information processing apparatus 1 can provide the user with high-quality slideshow wherein the reproduction time periods of images and sound coincide with each other irrespective of the reproduction time period of a tune selected as the BGM. Consequently, the information processing apparatus 1 can enhance the degree of satisfaction of the user.

Now, the play list production process performed at step S84 of FIG. 14 is described with reference to a flow chart of FIG. 22.

At step S131, the play list production section 135 acquires identification information such as the title of a photo album selected by the user, and then the processing advances to step S132. At step S132, the play list production section 135 acquires identification information of a tune of BGM selected by the user and identification information of a template coordinated with the tune. When the photo album is selected by the user, the title and so forth of the photo album are supplied from the content management section 131. Further, when the tune of BGM is selected by the user, identification information of the tune and identification information of the template coordinated with the tune are supplied from the BGM/template management section 132.

At step S133, the play list production section 135 produces a play list by describing the identification information of the photo album acquired at step S131 as "photo album" (FIG. 3) and describing the tune of BGM and the identification information of the template acquired at step S132 as "used tune" and "used template", respectively. After the play list is produced, the processing returns to step S84 of FIG. 14 so that the processes at the steps beginning with step S84 are executed.

It is to be noted that, where "preferential image" is selected by the user, also describing of the same is performed. Further, "play list name" is described in the play list when a title is inputted by the user (when it is decided at step S93 of FIG. 17 that the inputted title is appropriate).

The play list produced through such processes as described above by the play list production section 135 is supplied to the reproduction section 134 when an instruction to perform preview reproduction of the play list is issued by the user. Further, when another instruction to store the play list is issued, the play list is supplied to the content management section 131.

Figure 23:
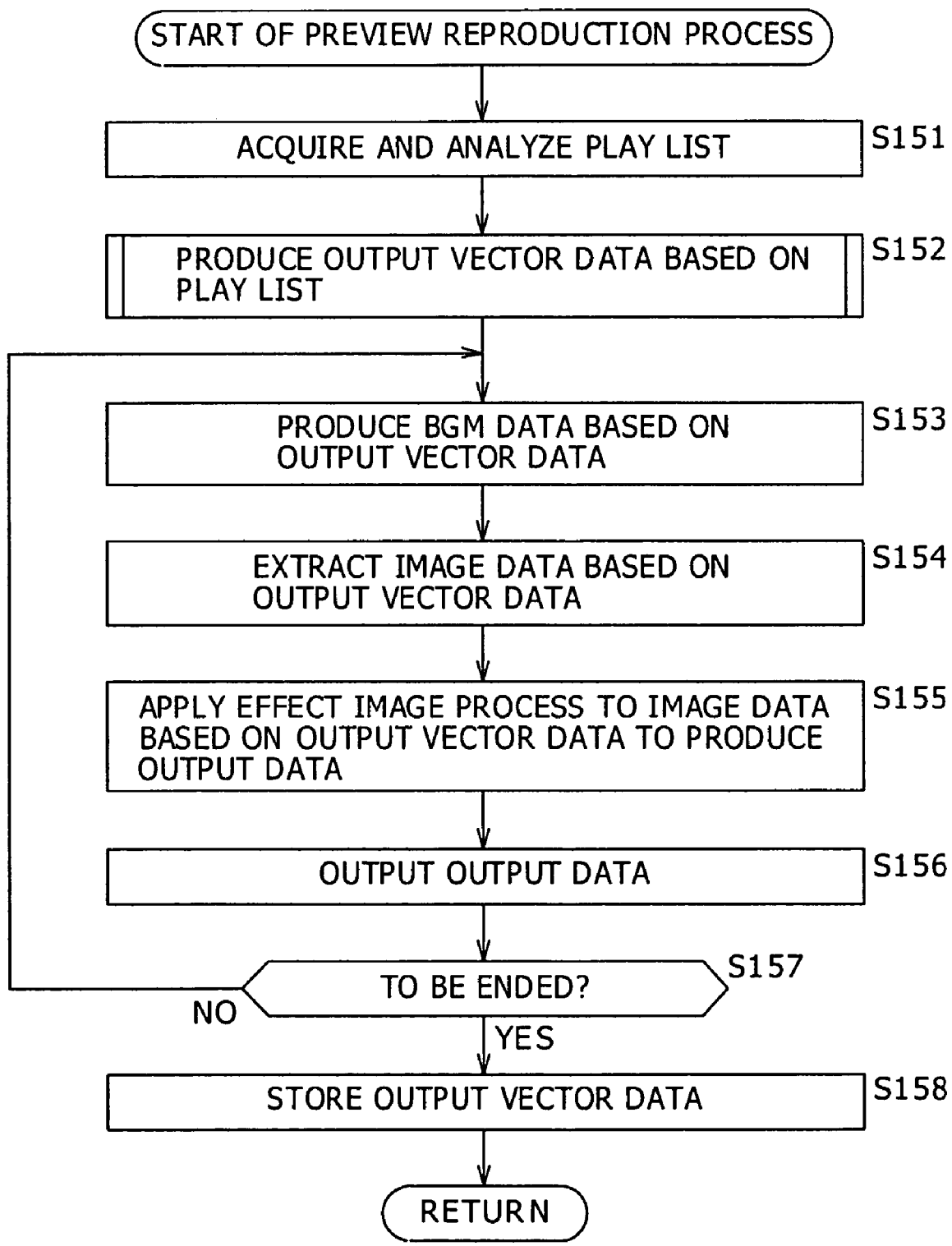
FIG. 23 is a flow chart illustrating details of a preview reproduction process.

Now, the preview reproduction process performed at step S87 of FIG. 15 is described with reference to a flow chart of FIG. 23. The preview reproduction process is performed based on a play list.

At step S151, the play list reproduction control section 141 (FIG. 7) acquires a play list supplied thereto from the play list production section 135, analyzes the play list and supplies information necessary for production of output vector data to the output vector data production section 142.

At step S152, the output vector data production section 142 executes the output vector data production process described hereinabove with reference to the flow chart of FIG. 9 as a sub flow process to produce output vector data based on the play list (information supplied thereto from the play list reproduction control section 141). In particular, the output vector data production section 142 executes the output vector data production process of FIG. 9 to amend the reproduction time period of effects (images) to produce output vector data wherein the reproduction time period of the effects (images) coincides with the reproduction time period of BGM (sound). The output vector data production section 142 supplies the produced output vector data to the BGM reproduction section 144, extraction section 145 and effect image processing section 146. It is to be noted that, while it is described hereinabove with reference to FIG. 9 that the output vector data production section 142 ends the output vector data production process after it ends the process at step S11, since, in this instance, the output vector data production section 142 executes the output vector data production process as a sub flow process, the processing is returned to step S152 after all processes are completed so that the processes at the steps beginning with step S153 are executed.

At step S153, the BGM reproduction section 144 acquires and reproduces BGM data based on the output vector data and supplies the BGM data to the effect image processing section 146 and so forth. At step S154, the extraction section 145 extracts image data (still pictures of an object of reproduction) from the photo album based on the output vector data and stores the image data into the internal memory 147.

At step S155, the effect image processing section 146 acquires image data from the internal memory 147 based on the output vector data wherein the reproduction time period of the effect (image) is amended so as to coincide with the reproduction time period of the BGM (sound), and performs an effect image process for the image data to produce output data.

At step S156, the effect image processing section 146 outputs the produced output data to the output control section 136.

At step S157, the play list reproduction control section 141 decides whether or not the preview reproduction process should be ended. If it is decided that the preview reproduction process should not be ended, then the processing is returned to step S153 so that the processes at the steps beginning with step S153 are executed repetitively. On the other hand, if it is decided at step S157 that the preview reproduction process should be ended, then the play list reproduction control section 141 advances the processing to step S158. At step S158, the effect image processing section 146 stores the output vector data utilized for the production of the output data into the internal memory 147 and then ends the preview reproduction process. Thereafter, the processing is returned to step S87 in FIG. 15 so that the processes at the steps beginning with step S87 are executed.

Since the output vector data production section 142 uses, in the preview reproduction process, a scaling coefficient to produce output vector data wherein the reproduction time period of an image coincides with the reproduction time period of BGM in this manner, the information processing apparatus 1 can perform preview reproduction for an arbitrary period of time wherein the reproduction time periods of images and sound coincide with each other. In other words, the information processing apparatus 1 can provide the user with high-quality slideshow wherein the reproduction time periods of images and sound coincide with each other irrespective of the reproduction time period of a tune selected as the BGM. Consequently, the information processing apparatus 1 can enhance the degree of satisfaction of the user.

Figure 24:
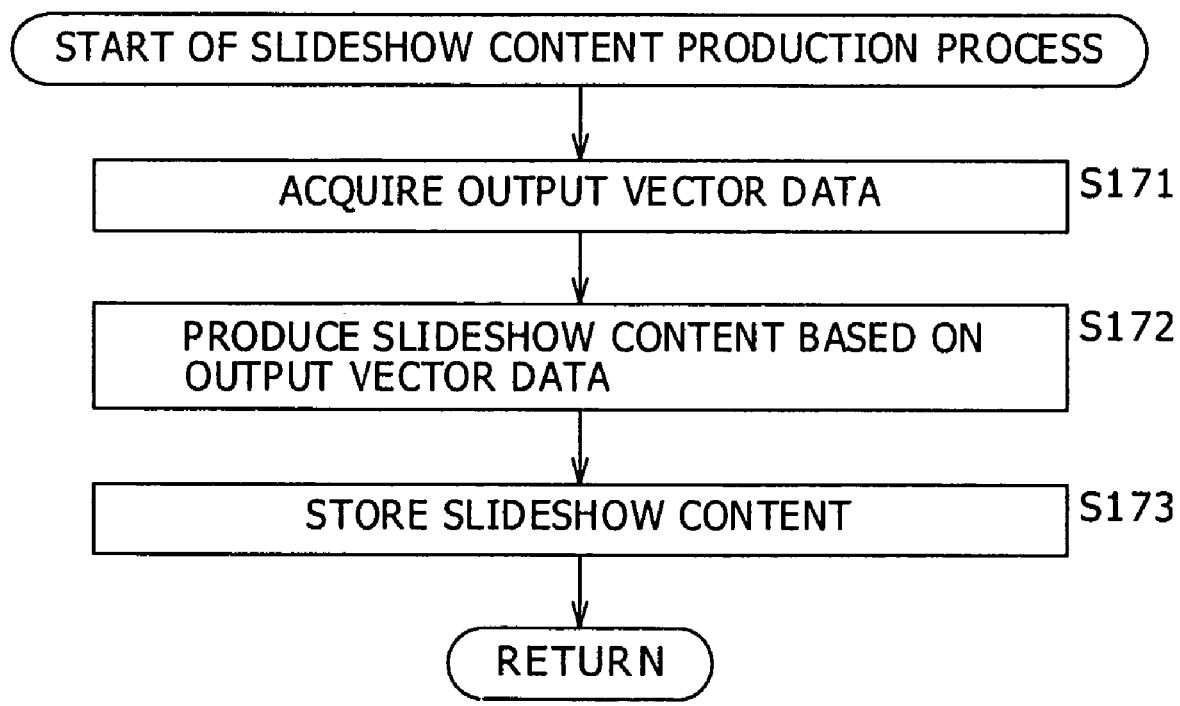
FIG. 24 is a flow chart illustrating details of a slideshow content production process.

Now, the slideshow content production process performed at step S109 of FIG. 16 is described with reference to a flow chart of FIG. 24. A slideshow content is produced from output vector data as described hereinabove. Further, the slideshow content production process is executed as a succeeding process of the play list reproduction process.

In particular, after the slideshow content production process is started in response to an instruction of the user or the like, the slideshow content production section 133 acquires output vector data held in the internal memory 147 of the reproduction section 134 at step S171.

After the output vector data are acquired, the slideshow content production section 133 produces a slideshow content by adding other information such as the title to the acquired output vector data at step S172. The produced slideshow content is supplied to the content management section 131.

At step S173, the content management section 131 supplies the slideshow content to the HDD 120 so as to be stored and then ends the slideshow content production process. Thereafter, the processing returns to step S109 of FIG. 18 so that the processes at the steps beginning with step S109 are executed.

After the slideshow content is stored in this manner, an icon representative of the slideshow content is added to "video" of the menu screen.

Figure 25:
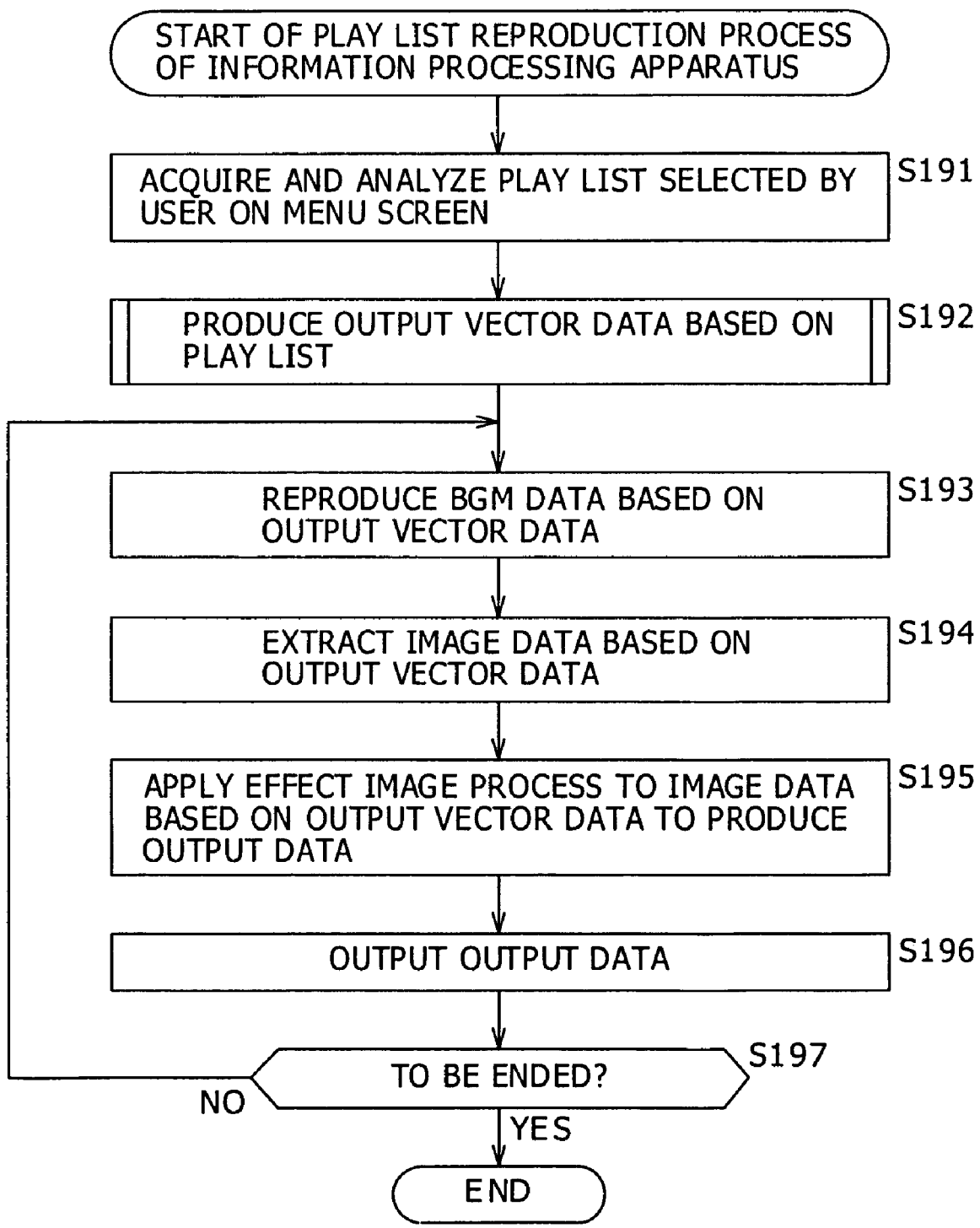
FIG. 25 is a flow chart illustrating a play list reproduction process of the information processing apparatus.

Now, the play list reproduction process performed by the information processing apparatus 1 is described with reference to a flow chart of FIG. 25.

This process is performed when an instruction to reproduce a play list produced by such a series of processes as described above is issued on the menu screen by the user. In other words, the play list reproduction process involves processes basically similar to those of the preview reproduction process described hereinabove with reference to the flow chart of FIG. 23.

In particular, at step S191, the play list reproduction control section 141 (FIG. 7) acquires a play list selected from within the menu screen by the user, analyzes the play list and supplies information necessary for production of output vector data to the output vector data production section 142. This process corresponds to the process at step S151 of FIG. 23.

At step S192, the output vector data production section 142 executes the output vector data production process described hereinabove with reference to the flow chart of FIG. 9 as a sub flow process to produce output vector data based on the play list (information supplied from the play list reproduction control section 141). In particular, the output vector data production section 142 executes the output vector data production process of FIG. 9 to produce output vector data wherein the reproduction time period of an effect (image) is corrected so as to coincide with the reproduction time period of BGM (sound). Then, the output vector data production section 142 supplies the produced output vector data to the BGM reproduction section 144, extraction section 145 and effect image processing section 146. It is to be noted that, while it is described hereinabove with reference to FIG. 9 that the output vector data production section 142 ends the output vector data production process after it ends the process at step S11, since, in this instance, the output vector data production section 142 executes the output vector data production process as a sub flow process, the processing is returned to step S192 after all processes are completed so that the processes at the steps beginning with step S193 are executed. This process corresponds to that at step S152 of FIG. 23.

At step S193, the BGM reproduction section 144 acquires and reproduces BGM data based on the output vector data and supplies the reproduced BGM data to the effect image processing section 146 and so forth. This process corresponds to the process at step S153 of FIG. 23. At step S194, the extraction section 145 extracts image data (still pictures of an object of reproduction) from the photo album based on the output vector data and stores the image data into the internal memory 147. This process corresponds to the process at step S154 of FIG. 23.

At step S195, the effect image processing section 146 acquires image data from the internal memory 147 based on the output vector data and performs an effect image process for the image data to produce output data. This process corresponds to the process at step S155 of FIG. 23.

At step S197, the play list reproduction control section 141 decides whether or not the play list reproduction process should be ended. If it is decided that the play list reproduction process should not be ended, then the processing is returned to step S193 so that the processes at the steps beginning with step S193 are executed repetitively. On the other hand, if it is decided at step S197 that the play list reproduction process should be ended, then the play list reproduction control section 141 ends the play list reproduction process.

Now, a reproduction process of a slideshow content performed by the information processing apparatus 1 is described with reference to a flow chart of FIG. 26.

This process is performed when an instruction to reproduce a slideshow content produced through such a series of processes as described above is issued on the menu screen by the user. In particular, also the slideshow content reproduction process involves processes basically similar to those of the play list reproduction process described above with reference to the flow chart of FIG. 25.

It is to be noted, however, that, in the present slideshow content reproduction process, not a play list but a slideshow content (output vector data) is utilized.

Accordingly, the slideshow content reproduction control section 143 (FIG. 7) acquires, at step S211, a slideshow content selected on the menu screen by the user and acquires output vector data included in the slideshow content. Then, the slideshow content reproduction control section 143 supplies the acquired output vector data to the BGM reproduction section 144, extraction section 145 and effect image processing section 146. This process corresponds to steps S191 and S192 of FIG. 27.

In short, since, in this instance, the output vector data produced by the output vector data production process described hereinabove with reference to the flow chart of FIG. 9 and executed formerly are utilized, the information processing apparatus 1 need not execute the output vector data production process described hereinabove with reference to the flow chart of FIG. 9 again.

At step S212, the BGM reproduction section 144 acquires and reproduces BGM data based on the output vector data and supplies the BGM data to the effect image processing section 146 and so forth. This process corresponds to the process at step S193 of FIG. 25. At step S213, the extraction section 145 extracts image data (still pictures of a reproduction object) from the photo album based on the output vector data and stores the image data into the internal memory 147. This process corresponds to the process at step S194 of FIG. 25.

At step S214, the effect image processing section 146 acquires image data from the internal memory 147 based on the output vector data and performs an effect image process for the image data to produce output data. This process corresponds to the process at step S195 of FIG. 25.

At step S215, the effect image processing section 146 outputs the produced output data to the output control section 136. This process corresponds to the process at step S196 of FIG. 25.

At step S216, the slideshow content reproduction control section 143 decides whether or not the slideshow content reproduction process should be ended. If the slideshow content reproduction process should not be ended, then the processing returns to step S212 so that the processes at the steps beginning with step S212 are executed repetitively. On the other hand, if it is decided at step S216 that the slideshow content reproduction process should be ended, then the slideshow content reproduction control section 143 ends the slideshow content reproduction processes.

Consequently, the user can enjoy the slideshow content in a feeling similar to that upon enjoyment of other video contents such as a television program.

As described above, the information processing apparatus 1 can provide the user with high-quality slideshow wherein the reproduction time periods of images and sound coincide with each other irrespective of the reproduction time period of a tune selected as the BGM. Consequently, the information processing apparatus 1 can enhance the degree of satisfaction of the user.

It is to be noted that tunes to be used as BGM may be prepared in advance in the information processing apparatus 1, or naturally the information processing apparatus 1 may be configured otherwise such that tunes fetched into the information processing apparatus 1 from a music CD or the like by the user may be selected as BGM.

When a tune is fetched into the information processing apparatus 1 from a music CD, also attribute information such as a tempo or a genre of the fetched tune is fetched into the information processing apparatus 1 from the music CD or from a predetermined server connected through a network, and a template of an effect suitable for the fetched tune is coordinated in accordance with an atmosphere of the tune determined from the attribute information. The coordination of the tune and the template is performed based, for example, on the attribute information of the tune and information of the "atmosphere" of the template of FIG. 4.

Consequently, the user can select a tune fetched into the information processing apparatus 1 by the user itself as BGM. Further, since a template is coordinated automatically with the fetched tune, the user can select also a template only by selecting a tune to be used as BGM.

It is to be noted that also a template itself coordinated with a tune is not prepared in advance in the information processing apparatus 1 but may be downloaded from a server connected through a network or may be fetched through the optical disk 125 or the like.

While the series of processes described above can be executed by hardware, it may otherwise be executed by software.

Where the series of processes described above are executed by software, a program which constructs the software is installed from a network or a recording medium into a computer incorporated in hardware for exclusive use or, for example, a personal computer for universal use which can execute various functions by installing various programs.

The recording medium may be formed as a memory card 123 or an optical disk 125 which has the program recorded thereon or therein and is distributed in order to provide the program to a user separately from an apparatus body, or as a ROM 112 or a hard disk included in a HDD 120 which has the program recorded therein or thereon and is provided to a user in a form wherein it is incorporated in an apparatus body in advance.

It is to be noted that, in the present specification, the steps may not be necessarily processed, as well as may be processed, in a time series in the order as described, and include processes which are executed in parallel or individually without being processed in a time series.

While preferred embodiments of the present invention have been described using specific terms, such description is for illustrative purposes only, and it is to be understood that changes and variations may be made without departing from the spirit or scope of the following claims.

What is claimed is:

1. An information processing apparatus for processing image data, comprising:
    a coefficient calculation section for calculating a coefficient for use for correction of an image data reproduction time period which is a reproduction time period of an image data group formed from a plurality of image data;
    a correction section for correcting reproduction control information of the image data to vary the reproduction time period of the image data using the coefficient calculated by said coefficient calculation section; and
    a reproduction control section for reproducing the image data based on the reproduction control information corrected by said correction section.

2. The information processing apparatus according to claim 1, wherein the reproduction control information is vector data, and said correction section refers to a table of frames included in the reproduction control information and a parameter to correct information of the frames using the coefficient.

3. The information processing apparatus according to claim 2, wherein the reproduction control information includes a set of pieces of effect control information of vector data which is control information for an effect process for the image data of the image data group to be reproduced, and said correction section corrects the reproduction control information so as to change the reproduction time period of the image data for each of the pieces of the effect control information.

4. The information processing apparatus according to claim 3, wherein said coefficient calculation section multiplies the image data reproduction time period to calculate the coefficient with which the image data reproduction time period coincides with a sound data reproduction time period which is a reproduction time period of sound data to be reproduced together with the image data group.

5. The information processing apparatus according to claim 4, further comprising:
  an effect selection section for selecting a plurality of pieces of effect control information prepared in advance one by one; and
  a total production time period calculation section for totaling the reproduction time periods of the image data of those pieces of the effect control information which are selected by said effect selection section to calculate a total reproduction time period;
  said effect selection section repeating the selection of the effect control information until said effect selection section ends the selection when the total reproduction time period calculated by said total reproduction time period calculation section exceeds the reproduction time period of the sound data.

6. The information processing apparatus according to claim 5, further comprising an effect control information deletion section for deleting one of the pieces of the effect control information from the set of effect control information when said effect selection section ends the selection of the effect control information and including the set of effect control information after the deletion into the reproduction control information.

7. The information processing apparatus according to claim 6, further comprising an effect control information selection section for deleting one of the pieces of the effect control information from the set of effect control information when said effect selection section ends the selection of the effect control information to select those pieces of the effect control information with which the total reproduction time period is most approximate to the reproduction time period of the sound data, said effect control information deletion section deleting the piece of the effect control information selected by said effect control information selection section.

8. The information processing apparatus according to claim 7, further comprising a decision section for deciding whether or not the total reproduction time period where the piece of the effect control information selected by said effect control information selection section is deleted is more proximate to the reproduction time period of the sound data than the total reproduction time period where the piece of the effect control information selected by said effect control information selection is not deleted, said effect control information deletion section deleting the piece of the effect control information selected by said effect control information selection section when it is decided by said decision section that the total reproduction time period where the piece of the effect control information selected by said effect control information selection section is deleted is more proximate to the reproduction time period of the sound data than the total reproduction time period where the piece of the effect control information selected by said effect control information selection section is not deleted.

9. An information processing method for an information processing apparatus for processing image data, comprising the steps of:
  calculating a coefficient for use for correction of an image data reproduction time period which is a reproduction time period of an image data group formed from a plurality of image data;
  correcting reproduction control information of the image data to vary the reproduction time period of the image data using the coefficient calculated by the process at the coefficient calculation step; and
  reproducing the image data based on the reproduction control information corrected by the process at the correction step.

10. A computer-readable medium storing a program for causing a computer to perform processing of image data, said program comprising the steps of:
  calculating a coefficient for use for correction of an image data reproduction time period which is a reproduction time period of an image data group formed from a plurality of image data;
  correcting reproduction control information of the image data to vary the reproduction time period of the image data using the coefficient calculated by the process at the coefficient calculation step; and
  reproducing the image data based on the reproduction control information corrected by the process at the correction step.

* * * * *

UNITED STATES PATENT AND TRADEMARK OFFICE
CERTIFICATE OF CORRECTION

PATENT NO. : 7,606,469 B2  Page 1 of 1
APPLICATION NO. : 11/295960
DATED : October 20, 2009
INVENTOR(S) : Inoue et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Twelfth Day of October, 2010

David J. Kappos
*Director of the United States Patent and Trademark Office*